United States Patent
Kamamoto et al.

(10) Patent No.: US 9,897,139 B2
(45) Date of Patent: Feb. 20, 2018

(54) TAPERED ROLLER BEARING AND POWER TRANSMISSION APPARATUS

(71) Applicant: JTEKT CORPORATION, Osaka-shi, Osaka (JP)

(72) Inventors: Shigeo Kamamoto, Kashiwara (JP); Junji Murata, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 33 days.

(21) Appl. No.: 15/031,204

(22) PCT Filed: Nov. 25, 2014

(86) PCT No.: PCT/JP2014/081129
§ 371 (c)(1),
(2) Date: Apr. 21, 2016

(87) PCT Pub. No.: WO2015/076419
PCT Pub. Date: May 28, 2015

(65) Prior Publication Data
US 2016/0265587 A1    Sep. 15, 2016

(30) Foreign Application Priority Data

Nov. 22, 2013 (JP) ................................ 2013-242043
Nov. 22, 2013 (JP) ................................ 2013-242058
Dec. 18, 2013 (JP) ................................ 2013-261376

(51) Int. Cl.
*F16C 19/36* (2006.01)
*F16C 33/66* (2006.01)
(Continued)

(52) U.S. Cl.
CPC .............. *F16C 19/364* (2013.01); *F16C 3/02* (2013.01); *F16C 33/4605* (2013.01);
(Continued)

(58) Field of Classification Search
CPC ...... F16C 3/02; F16C 19/364; F16C 33/4605; F16C 33/4676; F16C 33/4635;
(Continued)

(56) References Cited

U.S. PATENT DOCUMENTS 4,629,339 A * 12/1986 Morinaga ............. F16C 23/086
 384/576
4,728,204 A *  3/1988 Colanzi ................... B61F 15/12
 384/564
(Continued)

FOREIGN PATENT DOCUMENTS

EP    1746298 A4 *  8/2007  ............ F16C 19/364
EP    2664807 A2 * 11/2013  .......... F16C 33/4605
(Continued)

OTHER PUBLICATIONS

Feb. 24, 2015 Search Report issued in International Patent Application No. PCT/JP2014/081129.
(Continued)

*Primary Examiner* — Marcus Charles
(74) *Attorney, Agent, or Firm* — Oliff PLC

(57) ABSTRACT

A tapered roller bearing includes inner ring, outer ring, plurality of tapered rollers placed between inner and outer rings, and retainer having pockets receiving tapered rollers. Small diameter annular portion of retainer closes a small diameter side opening portion so that lubricating oil more than needed for lubrication can be limited from flowing into a bearing internal space. The small diameter side opening portion is constituted by a small collar portion provided on one axial end side of inner ring and one axial end portion of outer ring. A sliding contact face and recess portion are provided in radially outer side surface of each columnar portion. The sliding contact face is in sliding contact with outer ring raceway surface so that the retainer can be positioned radially by an outer ring raceway surface. Recess
(Continued)

portion is recessed radially so that adjacent ones of the pockets can communicate with each other.

27 Claims, 11 Drawing Sheets

(51) Int. Cl.
*F16C 13/02* (2006.01)
*F16C 33/46* (2006.01)
*F16C 3/02* (2006.01)

(52) U.S. Cl.
CPC ...... *F16C 33/4676* (2013.01); *F16C 33/6629* (2013.01); *F16C 33/6681* (2013.01); *F16C 33/4635* (2013.01); *F16C 2240/46* (2013.01)

(58) Field of Classification Search
CPC .............. F16C 33/6629; F16C 33/6681; F16C 33/498; F16C 2240/06; F16C 2240/40; F16C 2240/46; F16C 33/467
USPC ........ 384/462, 549, 557, 560, 565, 571–572
See application file for complete search history.

(56) References Cited

U.S. PATENT DOCUMENTS

| | | | |
|---|---|---|---|
| 5,033,878 A | 7/1991 | Tsuji et al. | |
| 5,039,231 A * | 8/1991 | Kispert | F16C 19/361 384/572 |
| 8,616,776 B2 * | 12/2013 | Nakamura | F16C 33/4635 384/470 |
| 2009/0074345 A1 | 3/2009 | Omoto | |
| 2011/0142389 A1 * | 6/2011 | Takeuchi | F16C 33/4635 384/572 |
| 2012/0321234 A1 | 12/2012 | Usuki et al. | |
| 2013/0315522 A1 | 11/2013 | Miyachi | |

FOREIGN PATENT DOCUMENTS

| | | | |
|---|---|---|---|
| JP | 55-10140 * | 1/1980 | ............ F16C 33/46 |
| JP | S61-49128 U | 4/1986 | |
| JP | H03-33510 A | 2/1991 | |
| JP | H03-69823 A | 3/1991 | |
| JP | H05-58956 U | 8/1993 | |
| JP | 2004-084799 A | 3/2004 | |
| JP | 2007-211833 A | 8/2007 | |
| JP | 2008-051295 A | 3/2008 | |
| JP | 4151347 B2 | 9/2008 | |
| JP | 2008-240898 A | 10/2008 | |
| JP | 2010-014193 A | 1/2010 | |
| JP | 2011-163387 A | 8/2011 | |
| JP | 2012-225492 A | 11/2012 | |
| JP | 2012-241828 A | 12/2012 | |
| JP | 2013-117312 A | 6/2013 | |
| JP | 2013-242018 A | 12/2013 | |
| JP | 5532157 B2 * | 6/2014 | .......... F16C 33/4635 |

OTHER PUBLICATIONS

May 16, 2017 Office Action issued in corresponding Japanese Patent Application No. 2013-242058.

Aug. 22, 2017 Office Action issued in Japanese Application No. 2013-261376.

Aug. 8, 2017 Office Action issued in Japanese Application No. 2013-242043.

* cited by examiner

Prior Art

TAPERED ROLLER BEARING AND POWER TRANSMISSION APPARATUS

CROSS REFERENCE TO RELATED APPLICATIONS

This application is the U.S. national phase of PCT/JP2014/081129, filed Nov. 25, 2014, which claims priority to JP 2013-261376, filed Dec. 18, 2013; JP 2013-242043, filed Nov. 22, 2013; and JP 2013-242058, filed Nov. 22, 2013. The disclosures of the prior applications are hereby incorporated by reference herein in their entirety.

TECHNICAL FIELD

The present invention relates to a tapered roller bearing and a power transmission apparatus using the tapered roller bearing.

BACKGROUND ART

A tapered roller bearing is characterized by having a larger load capacity and a higher rigidity than any other roller bearing of the same size.

FIG. 13 is an axially sectional view showing a tapered roller bearing in the related art. As shown in FIG. 13, a tapered roller bearing 100 has an inner ring 101, an outer ring 102, a plurality of tapered rollers 103 rollably placed between the inner and outer rings 101 and 102, and an annular retainer 104 retaining the tapered rollers 103 circumferentially at equal intervals (for example, see Patent Literature 1).

The retainer 104 has a small diameter annular portion 105, a large diameter annular portion 106, and a plurality of columnar portions 107 laid between the two annular portions 105 and 106. In addition, in the retainer 104, pockets 108 for receiving the tapered rollers 103 are constituted by the two annular portions 105 and 106 and adjacent ones of the columnar portions 107.

CITATION LIST

Patent Literature

Patent Literature 1: Japanese Patent No. 4151347

SUMMARY OF THE INVENTION

Problem that the Invention is to Solve

Generally, in a tapered roller bearing, there are a lot of sliding portions. Accordingly, rotary torque has a tendency to increase in comparison with that in a ball bearing or the like.

Here, causes of a torque loss in the tapered roller bearing are mainly and roughly classified into three, that is, rolling viscosity resistance between each bearing ring and each tapered roller, agitating resistance of lubricating oil flowing into an internal space of the bearing, and sliding friction resistance.

Of those causes, the rolling viscosity resistance between each bearing ring and each tapered roller and the agitating resistance of lubricating oil flowing into an internal space of the bearing make up most of the torque loss and chiefly cause increase in rotary torque.

The rolling viscosity resistance and the agitating resistance of lubricating oil depend on the amount of the lubricating oil flowing into an annular bearing internal space formed between the inner and outer rings. When the inflow amount of the lubricating oil flowing into the bearing internal space is suppressed, the torque loss can be reduced.

In the tapered roller bearing 100 in the related art shown in FIG. 13, when the inner and outer rings 101 and 102 rotate relatively to each other, pumping action is generated so that the lubricating oil in the bearing internal space can be made to flow on a raceway surface of each of the inner and outer rings 101 and 102 from its smaller diameter part toward its larger diameter part.

Thus, for example, when the tapered roller bearing 100 is partially or entirely immersed in lubricating oil, the lubricating oil flows into the bearing internal space of the tapered roller bearing 100 through a small diameter opening portion 110. The small diameter opening portion 110 is constituted by a small collar portion 101a provided on one axial end side of the inner ring 101, and one axial end portion of the outer ring 102. On the other hand, the lubricating oil in the bearing internal space of the tapered roller bearing 100 flows out from a large diameter opening portion 111 on the other axial end side.

Therefore, in order to suppress the inflow amount of the lubricating oil flowing into the bearing internal space, it can be considered that the small diameter opening portion 110 is closed with the small diameter annular portion 105 of the retainer 104 so as to properly limit the lubricating oil from flowing into the bearing internal space of the tapered roller bearing 100.

However, the retainer 104 is designed to retain intervals between adjacent ones of the tapered rollers 103 while being positioned axially and radially by the tapered rollers 103 received in the pockets 108 respectively. Further, due to a comparatively large clearance secured between each pocket 108 and each tapered roller 103, it cannot be said that the retainer 104 rotates stably with high accuracy between the inner and outer rings 101 and 102 when the inner and outer rings are rotating relatively to each other.

Therefore, the small diameter annular portion 105, which is a part of the retainer 104, also rotates unstably.

When the small diameter annular portion 105 rotates unstably, even if the small diameter annular portion 105 is formed to form a slight gap between the small diameter annular portion 105 and the small diameter opening portion so that the small opening portion 110 can be closed with the small diameter annular portion 105, the slight gap cannot be maintained stably or the small diameter annular portion may touch the circumferential surface of the small diameter opening portion so that the small diameter opening portion 110 cannot be closed stably. Thus, there may arise a problem that the inflow amount of the lubricating oil cannot be properly limited.

The present invention has been developed in consideration of such circumstances. A first object of the invention is to provide a tapered roller bearing capable of properly suppressing the inflow amount of lubricating oil flowing into an internal space of the bearing to thereby reduce a torque loss, and a power transmission apparatus using the tapered roller bearing.

In addition, in order to reduce a torque loss mainly caused by sliding friction resistance occurring in a sliding part between a roller end face and a collar portion, it is necessary to supply the lubricating oil thereto.

Therefore, if the inflow amount of the lubricating oil is suppressed to reduce the torque loss caused by the rolling viscosity resistance and the agitating resistance of the lubricating oil, it is indeed possible to reduce the rolling viscosity resistance and the agitating resistance of the lubricating oil but there is a fear that the torque loss cannot be reduced effectively due to unintended increase in sliding friction resistance. In addition, there is another fear that seizure may occur due to shortage of the lubricating oil.

Therefore, there has been a request for a measurement capable of reducing sliding friction resistance to suppress occurrence of seizure while limiting the amount of lubricating oil flowing into a bearing internal space.

The invention has been developed in consideration of such circumstances. A second object of the invention is to provide a tapered roller bearing capable of reducing sliding friction resistance to suppress occurrence of seizure while limiting the amount of lubricating oil flowing into an internal space of the bearing in order to reduce rotary torque, and a power transmission apparatus using the tapered roller bearing.

In addition, if the lubricating oil between each bearing ring and each tapered roller is reduced to a required quantity, the aforementioned rolling viscosity resistance can be further reduced so that the torque loss can be reduced accordingly.

When the torque loss can be reduced thus, fuel consumption can be improved or the amount of carbon dioxide emission can be reduced.

The invention has been developed in consideration of such circumstances. A third object of the invention is to provide a tapered roller bearing capable of properly suppressing the inflow amount of lubricating oil flowing into an internal space of the bearing while reducing the lubricating oil between each bearing ring and each tapered roller to thereby reduce a torque loss, and a power transmission apparatus using the tapered roller bearing.

Means for Solving the Problem

In order to attain the aforementioned first object, the invention provides a tapered roller bearing comprising: an inner ring that has an inner ring raceway surface; an outer ring that is disposed on an outer circumferential side of the inner ring and concentrically with the inner ring, and that has an outer ring raceway surface opposed to the inner ring raceway surface; a plurality of tapered rollers that are rollably placed between the inner ring raceway surface and the outer ring raceway surface; and a retainer that is disposed in an annular space between the inner ring and the outer ring, and that retains the tapered rollers, wherein: the retainer includes a small diameter annular portion, a large diameter annular portion opposed to the small diameter annular portion with a predetermined distance, and a plurality of columnar portions laid between the small diameter annular portion and the large diameter annular portion, wherein spaces surrounded by adjacent ones of the columnar portions and the annular portions are formed as pockets receiving the tapered rollers; the small diameter annular portion is disposed between a small collar portion provided on one axial end side of the inner ring and one axial end portion of the outer ring, and an inner circumferential surface and an outer circumferential surface of the small diameter annular portion can be in sliding contact with the small collar portion and the one axial end portion of the outer ring so that an annular opening portion constituted by the small collar portion and the one axial end portion of the outer ring is closed; and a sliding contact face is provided in a radially outer side surface of each of the columnar portions, and is in sliding contact with the outer ring raceway surface so that the retainer is positioned radially by the outer ring raceway surface, and a recess portion is provided in the radially outer side surface of each of the columnar portions, and is recessed radially so that adjacent ones of the pockets communicate with each other.

According to the tapered roller bearing configured as the above, the inflow amount of lubricating oil flowing into the annular space can be suppressed by the small diameter annular portion closing the annular opening portion constituted by the small collar portion and the one axial end portion of the outer ring. Thus, the torque loss of the tapered roller bearing can be reduced.

In addition, when the columnar portions are in sliding contact with the outer ring raceway surface, the retainer of the aforementioned tapered roller bearing is positioned radially and guided to the outer ring raceway surface to thereby rotate thereon. Therefore, the retainer can rotate stably and accurately between the inner and outer rings, and the small diameter annular portion closing the annular opening portion can also rotate stably and accurately. As a result, the annular opening portion can be closed so stably that the inflow amount of the lubricating oil can be limited properly.

On the other hand, in the aforementioned tapered roller bearing, when the columnar portions of the retainer are in sliding contact with the outer ring raceway surface, the effect of agitating the lubricating oil near the outer ring raceway surface can be enhanced so that the effect of pumping action can be enhanced by the increasing flow rate of the lubricating oil. Thus, the effect of attracting external lubricating oil into the annular space may be enhanced.

With regard to this point, in the aforementioned tapered roller bearing, a recess portion is provided in the radially outer side surface of each columnar portion, and is recessed radially so that adjacent ones of the pockets can communicate with each other through the recess portion. Thus, the lubricating oil near the outer ring raceway surface can be made to flow between adjacent ones of the pockets, so as to weaken the agitating effect to thereby suppress the flow rate of the lubricating oil from increasing excessively. Thus, the effect of pumping action can be weakened to suppress the lubricating oil from excessively flowing into the annular space. As a result, the inflow amount of the lubricating oil into the annular space that is an internal space of the bearing can be limited properly.

In this manner, according to the aforementioned tapered roller bearing, the inflow amount of the lubricating oil flowing into the internal space of the bearing can be suppressed to reduce the torque loss.

Since the circumferential velocity of each columnar portion is higher at a part on the larger diameter side, the effect of agitating the lubricating oil is enhanced, and the part on the larger diameter side has larger contribution to the pumping action. On the other hand, when the amount of the lubricating oil passing through the recess portion is increased, the effect of the pumping action can be weakened.

Accordingly, in the aforementioned tapered roller bearing, it is preferable that a bottom face of the recess portion is a slope that is inclined with respect to the outer ring raceway surface so that a gap between the bottom face and the outer ring raceway surface gradually expands axially from the small diameter annular portion toward the large diameter annular portion.

In this case, the gap between the bottom face and the outer ring raceway surface expands on the larger diameter side where the agitating effect is higher than on the smaller diameter side. It is therefore possible to increase the amount of the lubricating oil passing through a part on the larger diameter side that is a part higher in agitating effect and larger in contribution to the pumping action. Thus, the pumping action can be weakened effectively.

In addition, in the aforementioned tapered roller bearing, it is preferable that the recess portion is provided to be located at an axial center of the outer ring raceway surface. In this case, sliding contact faces to be provided on a radially outer side surface of each columnar portion may be provided on the axially opposite sides of the recess portion. Thus, even if the recess portion is provided in the radially outer side surface of the columnar portion, the two sliding contact faces axially separated from each other on the axially opposite sides of the recess portion slidingly contact so that the retainer can be suppressed from tilting while the sliding contact faces are stably in sliding contact with the outer ring raceway surface.

In the aforementioned tapered roller bearing, axial length of the recess portion may be set within a range equal to or larger than 40% of axial length of the outer ring raceway surface and equal to or smaller than 70% of the axial length of the outer ring raceway surface. When the axial length of the recess portion is made smaller than 40% of the axial length of the outer ring raceway surface, the effect of weakening the pumping action deteriorates extremely. When the axial length of the recess portion is made larger than 70% of the axial length of the outer ring raceway surface, it is difficult to secure an area needed as each sliding contact face in the radially outer side surface of the columnar portion. When the axial length of the recess portion is set within a range equal to or larger than 40% of the axial length of the outer ring raceway surface and equal to or smaller than 70% of the axial length of the outer ring raceway surface, it is possible to weaken the pumping action effectively while securing an area needed as each sliding contact face in the radially outer side surface of the columnar portion.

In addition, in the aforementioned tapered roller bearing, it is preferable that a gap between the bottom face of the recess portion and the outer ring raceway surface is set to be at least ten times as large as a gap needed for the outer ring raceway surface and the sliding contact face to be in sliding contact with each other at a bearing working temperature.

When the gap between the bottom face and the outer ring raceway surface is less than ten times as large as the gap needed for the outer ring raceway surface and the sliding contact face to be in sliding contact with each other at the bearing working temperature, it is difficult to make the lubricating oil near the outer ring raceway surface flow satisfactorily between adjacent ones of the pockets. Thus, the effect of weakening the pumping action deteriorates. Therefore, when the gap between the bottom face and the outer ring raceway surface is made at least ten times as large as the gap needed for the outer ring raceway surface and the sliding contact face to be in sliding contact with each other at the bearing working temperature, the pumping action can be weakened effectively.

In the aforementioned tapered roller bearing, an annular gap for limiting lubricating oil amount of which is equal to or more than a needed amount from flowing into the annular space may be formed between an inner circumferential surface of the small diameter annular portion and an outer circumferential surface of the small collar portion, and a radially inner side surface of each of the columnar portions is formed into a guide surface that extends from an end portion of the inner circumferential surface of the small diameter annular portion toward a base end portion of a large collar portion provided on the other axial end side of the inner ring so that the lubricating oil flowing into the annular space through the annular gap is guided to the base end portion of the large collar portion.

In this case, a part of the lubricating oil passing through the annular gap from the outside of the bearing and flowing into the annular space is transmitted from the inner circumferential surface of the small diameter annular portion to the inner circumferential surface of each columnar portion. Further, since the inner circumferential of the columnar portion is formed into a guide surface for guiding the lubricating oil to the base end portion of the large collar portion, the lubricating oil transmitted to the inner circumferential surface of the columnar portion can be guided to the base end portion of the large collar portion. Thus, while the amount of the lubricating oil flowing into the annular space is limited, the lubricating oil in the annular space can be aggressively supplied to the vicinity of a contact part where the end face of each tapered roller and the large collar portion slidingly contact smoothly on each other. As a result, it is possible to reduce the sliding friction resistance between the end face of the tapered roller and the large collar portion while limiting the amount of the lubricating oil flowing into the annular space. It is further possible to suppress occurrence of seizure caused by shortage of the lubricating oil.

In addition, in the aforementioned tapered roller bearing, it is preferable that the radially inner side surface is a slope that is inclined with respect to the inner ring raceway surface so that a gap between the radially inner side surface and the inner ring raceway surface is gradually narrowed axially from the small diameter annular portion toward the large diameter annular portion. In this case, the lubricating oil can be guided to the base end portion of the large collar portion smoothly by the inner circumferential surface of each columnar portion where there is no step or the like in the axial direction.

In the aforementioned tapered roller bearing, a groove portion that is recessed radially outward may be formed axially in the radially inner side surface. In this case, the lubricating oil transmitted from the inner circumferential surface of the small diameter annular portion to the radially inner side surface of the columnar portion can be kept in the groove portion. Further, the lubricating oil kept in the groove portion can be guided to the base end portion of the large collar portion along the groove portion. Thus, the lubricating oil can be guided to the base end portion of the large collar portion more surely.

In addition, in the aforementioned tapered roller bearing, a size of the annular gap at a bearing working temperature may be set to be larger than a size of a gap needed for the outer ring raceway surface and the sliding contact face to be in sliding contact with each other at the bearing working temperature, and to be three or less times as large as the size of the gap.

The outer circumferential surface of the small collar portion is lower in accuracy than the outer ring raceway surface formed as a finished surface with comparatively high precision. Accordingly, when the size of the annular gap at the bearing working temperature is equal to or smaller than the size of the gap needed for the outer ring raceway surface and the sliding contact face to be in sliding contact with each other at the bearing working temperature, the annular gap may be narrowed more than needed. Thus, there is a fear that a necessary inflow amount of lubricating oil cannot be secured.

On the other hand, when the size of the annular gap at the bearing working temperature is more than three times as large as the size of the gap needed for the outer ring raceway surface and the sliding contact face to be in sliding contact with each other at the bearing working temperature, there is a fear that lubricating oil more than needed may be permitted to flow in.

When the size of the annular gap at the bearing working temperature is set to be larger than the size of the gap needed for the outer ring raceway surface and the sliding contact face to be in sliding contact with each other at the bearing working temperature and to be three or less times as large as the size of the needed gap, the inflow amount of the lubricating oil can be limited properly.

In order to attain the aforementioned second object, the invention provides a tapered roller bearing comprising: an inner ring that has an inner ring raceway surface; an outer ring that is disposed on an outer circumferential side of the inner ring and concentrically with the inner ring, and that has an outer ring raceway surface opposed to the inner ring raceway surface; a plurality of tapered rollers that are rollably placed between the inner ring raceway surface and the outer ring raceway surface; and a retainer that is disposed in an annular space between the inner ring and the outer ring, and that retains the tapered rollers, wherein: the retainer includes a small diameter annular portion, a large diameter annular portion opposed to the small diameter annular portion with a predetermined distance, and a plurality of columnar portions laid between the small diameter annular portion and the large diameter annular portion, wherein spaces surrounded by adjacent ones of the columnar portions and the annular portions are formed as pockets receiving the tapered rollers; the small diameter annular portion is disposed between a small collar portion provided on one axial end side of the inner ring and one axial end portion of the outer ring, and an inner circumferential surface and an outer circumferential surface of the small diameter annular portion can be in sliding contact with the small collar portion and the one axial end portion of the outer ring so that an annular opening portion constituted by the small collar portion and the one axial end portion of the outer ring is closed while an annular gap for limiting lubricating oil more than needed for lubricating the tapered roller bearing from flowing into the annular space is formed between an inner circumferential surface of the small diameter annular portion and an outer circumferential surface of the small collar portion; and a radially inner side surface of each of the columnar portions is formed into a guide surface that extends from an end portion of the inner circumferential surface of the small diameter annular portion toward a base end portion of a large collar portion provided on the other axial end side of the inner ring so that the lubricating oil flowing into the annular space through the annular gap is guided to the base end portion of the large collar portion.

According to the tapered roller bearing configured as the above, the inflow amount of lubricating oil flowing into the annular space can be suppressed by the small diameter annular portion. Thus, the torque loss caused by rolling viscosity resistance of the tapered roller bearing and agitating resistance of the lubricating oil can be reduced.

In addition, while the amount of the lubricating oil flowing into the annular space is limited, a part of the lubricating oil passing through the annular gap from the outside of the bearing and flowing into the annular space is transmitted from the inner circumferential surface of the small diameter annular portion to the inner circumferential surface of each columnar portion. Further, since the inner circumferential of the columnar portion is formed as a guide surface for guiding the lubricating oil to the base end portion of the large collar portion, the lubricating oil transmitted to the inner circumferential surface of the columnar portion can be guided to the base end portion of the large collar portion. Thus, while the amount of the lubricating oil flowing into the annular space is limited, the lubricating oil in the annular space can be aggressively supplied to the vicinity of a contact part where the end face of each tapered roller and the large collar portion slidingly contact smoothly on each other. As a result, it is possible to reduce the sliding friction resistance between the end face of the tapered roller and the large collar portion while limiting the amount of the lubricating oil flowing into the annular space in order to reduce the rotary torque. It is further possible to suppress occurrence of seizure caused by shortage of the lubricating oil.

In addition, in the aforementioned tapered roller bearing, it is preferable that the radially inner side surface is a slope that is inclined with respect to the inner ring raceway surface so that a gap between the radially inner side surface and the inner ring raceway surface is gradually narrowed axially from the small diameter annular portion toward the large diameter annular portion. In this case, the lubricating oil can be guided to the base end portion of the large collar portion smoothly by the inner circumferential surface of each columnar portion where there is no step or the like in the axial direction.

In the aforementioned tapered roller bearing, a groove portion that is recessed radially outward may be formed axially in the radially inner side surface. In this case, the lubricating oil transmitted from the inner circumferential surface of the small diameter annular portion to the radially inner side surface of the columnar portion can be kept in the groove portion. Further, the lubricating oil kept in the groove portion can be guided to the base end portion of the large collar portion along the groove portion. Thus, the lubricating oil can be guided to the base end portion of the large collar portion more surely.

In addition, in the aforementioned tapered roller bearing, a size of the annular gap at a bearing working temperature may be set to be larger than a size of a gap needed for the outer ring raceway surface and a sliding contact face to be in sliding contact with each other at the bearing working temperature, and to be three or less times as large as the size of the gap.

The outer circumferential surface of the small collar portion is lower in accuracy than the outer ring raceway surface formed as a finished surface with comparatively high precision. Accordingly, when the size of the annular gap at the bearing working temperature is equal to or smaller than the size of the gap needed for the outer ring raceway surface and the sliding contact face to be in sliding contact with each other at the bearing working temperature, the annular gap may be narrowed more than needed. Thus, there is a fear that a necessary inflow amount of lubricating oil cannot be secured.

On the other hand, when the size of the annular gap at the bearing working temperature is more than three times as large as the size of the gap needed for the outer ring raceway surface and the sliding contact face to be in sliding contact with each other at the bearing working temperature, there is a fear that lubricating oil more than needed may be permitted to flow in.

When the size of the annular gap at the bearing working temperature is set to be larger than the size of the gap needed for the outer ring raceway surface and the sliding contact face to be in sliding contact with each other at the bearing working temperature and to be three or less times as large as the size of the gap, the inflow amount of the lubricating oil can be limited properly.

In the aforementioned tapered roller bearing, it is preferable that a sliding contact face is provided in a radially outer side surface of each of the columnar portions, and is in sliding contact with the outer ring raceway surface so that the retainer is positioned radially by the outer ring raceway surface.

In this case, the retainer guided to rotate by the outer ring raceway surface can rotate stably and accurately between the inner and outer rings, and the small diameter annular portion closing the annular opening portion can also rotate stably and accurately. As a result, the annular opening portion can be closed so stably that the inflow amount of the lubricating oil can be limited properly.

On the other hand, in the aforementioned tapered roller bearing, when the columnar portions of the retainer are in sliding contact with the outer ring raceway surface, the effect of agitating the lubricating oil near the outer ring raceway surface can be enhanced so that the effect of pumping action can be enhanced due to the increasing flow rate of the lubricating oil. Thus, the effect of attracting external lubricating oil into the annular space may be enhanced.

With regard to this point, a recess portion may be provided in the radially outer side surface of each columnar portion, and is recessed radially so that adjacent ones of the pockets communicate with each other. In this case, the lubricating oil near the outer ring raceway surface can be made to flow between adjacent ones of the pockets, so as to weaken the agitating effect to thereby suppress the flow rate of the lubricating oil from increasing excessively. Thus, the effect of pumping action can be weakened to suppress the lubricating oil from excessively flowing into the annular space. As a result, the inflow amount of the lubricating oil into the annular space that is an internal space of the bearing can be limited properly.

In order to attain the aforementioned third object, the invention provides a tapered roller bearing comprising: an inner ring that has an inner ring raceway surface, and that has a large collar portion in one axial end portion; an outer ring that is disposed on an outer circumferential side of the inner ring and concentrically with the inner ring, and that has an outer ring raceway surface opposed to the inner ring raceway surface; a plurality of tapered rollers that are rollably placed between the inner two raceway surfaces; and a retainer that is disposed in an annular space between the inner and outer rings, and that retains the tapered rollers, wherein: the retainer includes a small diameter annular portion, a large diameter annular portion opposed to the small diameter annular portion with a predetermined distance, and a plurality of columnar portions laid between the two annular portions, wherein spaces surrounded by adjacent ones of the columnar portions and the annular portions are formed as pockets receiving the tapered rollers; a sliding contact face is provided in a radially outer side surface of each of the columnar portions, and is in sliding contact with the outer ring raceway surface so that the retainer is positioned radially by the outer ring raceway surface; an end portion of a radially inner side surface of each of the columnar portions on a side of the large diameter annular portion is disposed on a radially inner side of an outer circumferential surface of the large collar portion; and an inner circumferential side of a circumferential side surface of each of the columnar portions is formed into a curved surface along a rolling surface of each of the tapered rollers, and a circumferential width W2 of the radially inner side surface of each of the columnar portions is made wider than a circumferential width W1 of the radially outer side surface of each of the columnar portions.

According to the aforementioned configuration, when the columnar portions are in sliding contact with the outer ring raceway surface, the retainer is positioned radially and guided to the outer ring raceway surface to thereby rotate thereon. Therefore, the retainer can rotate stably and accurately between the inner and outer rings.

In addition, since the columnar portions are in sliding contact with the outer ring raceway surface, the lubricating oil can be suppressed from flowing into the bearing internal space so as to reduce the rolling viscosity resistance depending on the amount of the lubricating oil flowing in or the agitating resistance of the lubricating oil. Thus, the torque loss of the tapered roller bearing can be reduced.

Further, the lubricating oil on the rolling surfaces of the tapered rollers can be scraped by the inner circumferential sides of the circumferential side surfaces of the columnar portions so as to reduce the lubricating oil between each bearing ring and each tapered roller. Thus, the rolling viscosity resistance can be reduced so that the torque loss can be further reduced.

In addition, since the retainer is positioned radially as described above, the distance between the inner circumferential side of the circumferential side surface of each columnar and the rolling surface of each tapered roller can be kept proper. Thus, the lubricating oil can be scraped well from the rolling surface.

A gap in a radial direction between the inner circumferential side of each of the columnar portions and the rolling surface may be made larger than a gap in the same radial direction between the radially outer side surface of each of the columnar portions and the outer ring raceway surface.

According to this configuration, the outer ring can be guided well by the retainer, and the torque loss caused by the contact between the retainer and each tapered roller can be reduced.

Incidentally, in the radially inner side surface of each of the columnar portions, a circumferential width W4 of the end portion on the side of the large diameter annular portion may be made wider than a circumferential width W3 of an end portion on a side of the small diameter annular portion.

According to this configuration, a part where the circumferential side surface of each columnar portion overlaps with each tapered roller when the columnar portion is observed radially increases toward the large diameter annular portion. Thus, the lubricating oil adhering to the inner ring raceway surface side of the rolling surface of the tapered roller can be scraped more satisfactorily in a position closer to the large diameter annular portion. Therefore, the lubricating oil between each bearing ring and each tapered roller can be suppressed from staying on the large diameter annular portion side, and the lubricating oil can be discharged to the outside of the bearing more quickly. As a result, the rolling viscosity resistance can be further reduced so that the torque loss can be further reduced.

In addition, a ratio W4/W3 of the circumferential width W4 to the circumferential width W3 may be made larger than a ratio R2/R1 of a maximum outer diameter R2 to a minimum outer diameter R1 in each of the tapered rollers.

According to this configuration, a part where the circumferential side surface of each columnar portion overlaps with each tapered roller when the columnar portion is observed radially can be made larger toward the large diameter annular portion than in the aforementioned "case where the circumferential width W4 is made wider than the circumferential width W3". Thus, the lubricating oil adhering to the inner ring raceway surface side of the rolling surface of the tapered roller can be scraped more satisfactorily in a position closer to the large diameter annular portion. Therefore, the lubricating oil can be discharged to the outside of the bearing more quickly. As a result, the rolling viscosity resistance can be further reduced so that the torque loss can be further reduced.

Further, a guide groove for guiding lubricating oil to the large collar portion may be formed axially in the radially inner side surface of each of the columnar portions.

According to this configuration, the lubricating oil scraped from the rolling surface of each tapered roller by the circumferential side surface of each columnar portion can be kept in the groove portion. The lubricating oil can be prevented from returning to the rolling surface or the like. In addition, the lubricating oil kept in the groove portion can be guided to the large collar portion along the groove portion. Thus, the sliding friction resistance between the large diameter side end face of each tapered roller and the large collar portion can be reduced so that occurrence of seizure caused by shortage of lubricating oil can be suppressed.

In addition, a width of the guide groove may be gradually increased toward the large diameter annular portion.

Since the lubricating oil is scraped from the rolling surface of each tapered roller by the circumferential side surface extending axially in each columnar portion, the amount of the lubricating oil stored in the groove portion increases toward the large diameter annular portion. According to the aforementioned configuration, however, the width of the groove portion is gradually increased toward the large diameter annular portion. It is therefore possible to prevent the lubricating oil from overflowing from the groove portion and returning to the rolling surface or the like.

In addition, a power transmission apparatus according to the invention is characterized by comprising: a transmission shaft; the aforementioned tapered roller bearing; and a support that supports the transmission shaft rotatably through the tapered roller bearing.

According to this configuration, the transmission shaft is supported on the support through the tapered roller bearing according to the invention capable of reducing the torque loss, so that the power loss during power transmission through the transmission shaft can be reduced.

Advantage of the Invention

According to a configuration of the invention, it is possible to provide a tapered roller bearing capable of properly suppressing the inflow amount of lubricating oil flowing into an internal space of the bearing to thereby reduce a torque loss, and a power transmission apparatus using the tapered roller bearing.

According to another configuration of the invention, it is possible to provide a tapered roller bearing capable of limiting the amount of lubricating oil flowing into an internal space of the bearing in order to reduce the rotary torque while reducing sliding friction resistance to thereby suppress occurrence of seizure, and a power transmission apparatus using the tapered roller bearing.

BRIEF DESCRIPTION OF THE DRAWINGS

in FIG. 6 are observed from the radially inner side.

MODE FOR CARRYING OUT THE INVENTION

Figure 1:
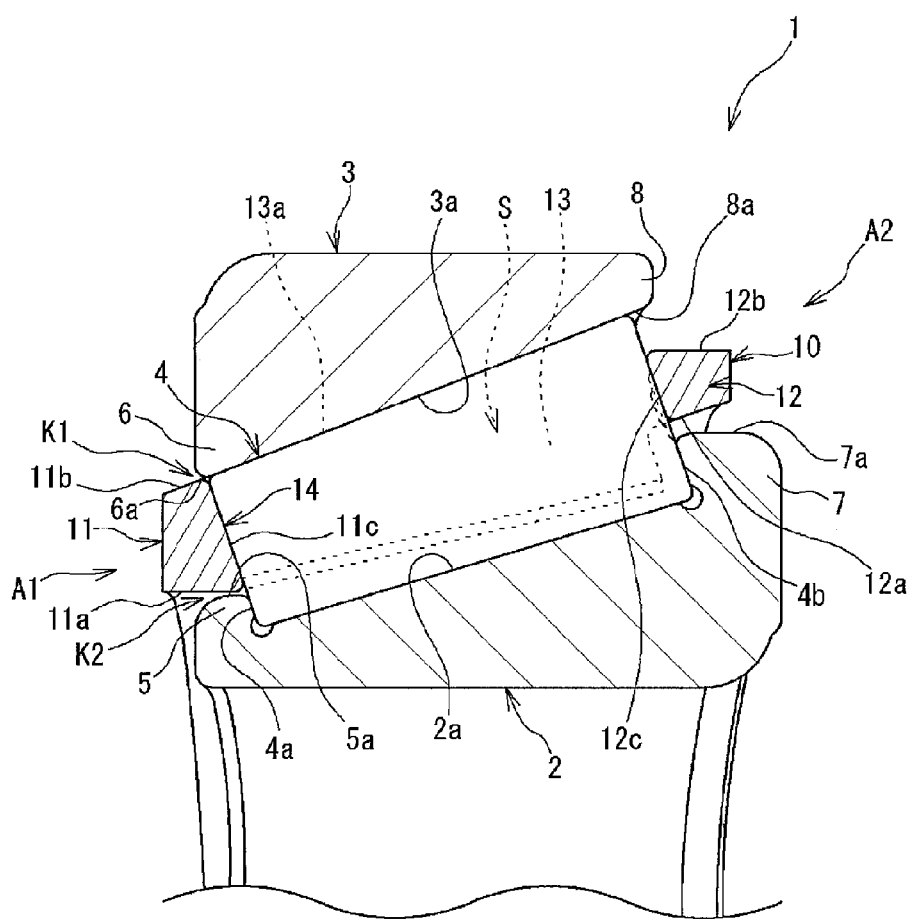
FIG. 1 is an axially sectional view of a tapered roller bearing according to an embodiment of the invention.

Next, a preferred embodiment of the invention will be described with reference to the accompanying drawings. FIG. 1 is an axially sectional view of a tapered roller bearing according to the embodiment of the invention.

A tapered roller bearing 1 has an inner ring 2, an outer ring 3 disposed on the outer circumferential side of the inner ring 2 and concentrically with the inner ring 2, and a plurality of tapered rollers 4 arrayed between the inner and outer rings 2 and 3.

The inner ring 2 is an annular member formed out of bearing steel, steel for machine structural use, or the like. An inner ring raceway surface 2a is formed in the outer circumference of the inner ring 2 so that the tapered rollers 4 can roll on the inner ring raceway surface 2a.

The outer ring 3 is also an annular member formed out of bearing steel, steel for machine structural use, or the like in the same manner as the inner ring 2. An outer ring raceway surface 3a is formed in the inner circumference of the outer ring 3 so that the outer ring raceway surface 3a can be opposed to the inner ring raceway surface 2a and the tapered rollers 4 can roll on the outer ring raceway surface 3a. The raceway surfaces 2a and 3a are super-finished (machined).

The tapered rollers 4 are members formed out of bearing steel or the like. The tapered rollers 4 are put rollably between the inner ring raceway surface 2a and the outer ring raceway surface 3a. A small diameter side end face 4a and a large diameter side end face 4b of each tapered roller are super-finished (machined).

The tapered roller bearing 1 has a retainer 10 retaining the tapered rollers 4.

Figure 2:
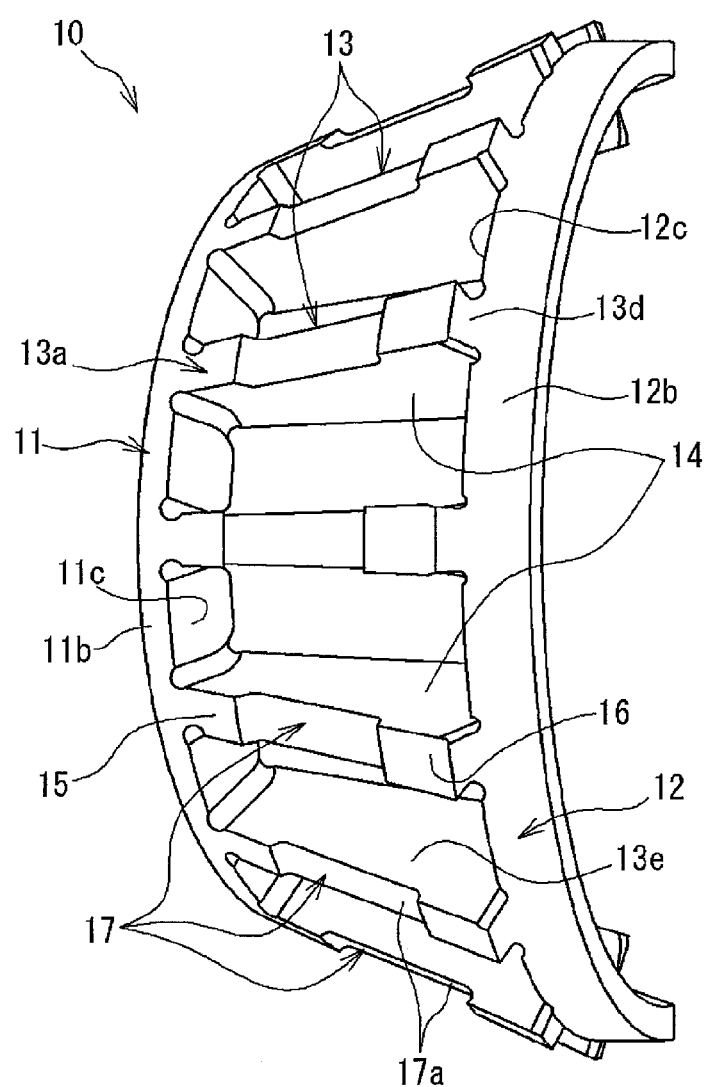
FIG. 2 is a partial perspective view of a retainer observed from the outer circumferential side.
Figure 3:
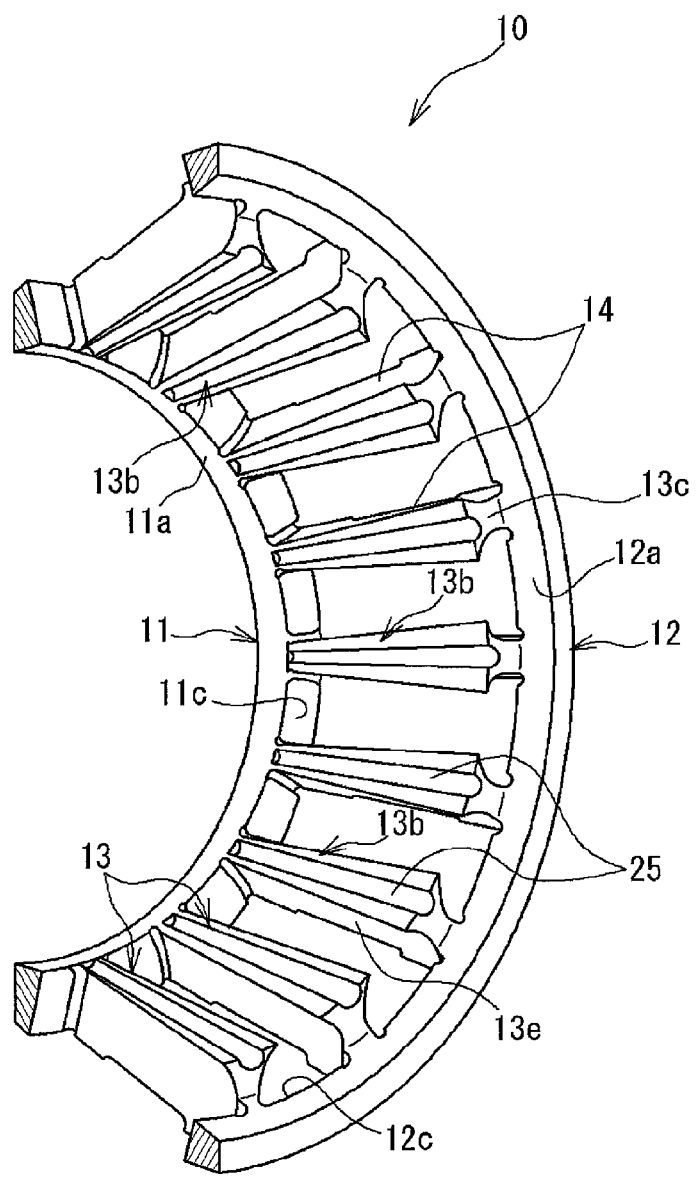
FIG. 3 is a partial sectional view of the retainer observed from the inner circumferential side.

FIG. 2 is a partial perspective view of the retainer 10 observed from the outer circumferential side. FIG. 3 is a partial perspective view of the retainer 10 observed from the inner circumferential side. As shown in FIG. 1 to FIG. 3, the retainer 10 is a member made of synthetic resin and formed by injection molding or the like. The retainer 10 has a pair of annular portions 11 and 12 (a small diameter annular portion 11 and a large diameter annular portion 12) opposed to each other with a predetermined distance, and a plurality of columnar portions 13 laid circumferentially at predetermined intervals between the annular portions 11 and 12. Spaces surrounded by the paired annular portions 11 and 12 and adjacent two of the columnar portions 13 form pockets 14 for receiving and retaining the tapered rollers 4 respectively.

The retainer 10 is disposed in a bearing internal space S that is an annular space formed between the inner ring 2 and the outer ring 3. The retainer 10 receives the tapered rollers 4 in the pockets 14 respectively and retains the tapered rollers 4 so that the tapered rollers 4 can be disposed circumferentially at substantially equal intervals.

Of the two annular portions 11 and 12, annular portion side surfaces 11c and 12c facing the pockets 14 are in sliding contact with the small diameter side end face 4a and the large diameter side end face 4b of each tapered roller 4 so that the retainer 10 can be restricted from moving axially. That is, the two annular portions 11 and 12 are in sliding contact with the end faces 4a and 4b of the tapered rollers 4 so as to position the retainer 10 axially.

In addition, in the retainer 10, radially outer side surfaces 13a of the columnar portions 13 are formed to be in sliding contact with the outer ring raceway surface 3a, so that the radially outer side surfaces 13a can rotate circumferentially relatively to the outer ring raceway surface 3a while slidingly contacting thereon. Thus, the retainer 10 is positioned radially by the outer ring raceway surface 3a.

The small diameter annular portion 11 of the retainer 10 is an annular part formed to have a radial thickness as large as the radial thickness of each columnar portion 13. The small diameter annular portion 11 is disposed between a small collar portion 5 provided on one axial end side of the inner ring 2 and an one axial end portion 6 of the outer ring 3. Thus, an inner circumferential surface 11a and an outer circumferential surface 11b of the small diameter annular portion 11 can be in sliding contact with the small collar portion 5 and the one axial end portion 6 of the outer ring 3, so as to close a small diameter side opening portion A1 constituted by the small collar portion 5 and the one axial end portion 6 of the outer ring 3.

The outer circumferential surface 11b of the small diameter annular portion 11 is formed as a taper surface extended directly from a radially outer side surface 13a of each columnar portion 13 being in sliding contact with the outer ring raceway surface 3a. A gap (clearance) needed for the outer ring raceway surface 3a and the radially outer side surface 13a of the columnar portion 13 to be in sliding contact with each other at a working temperature with which the tapered roller bearing 1 should work is provided between the outer ring raceway surface 3a and the radially outer side surface 13a. A first annular gap K1 that is a gap as large as the aforementioned clearance is provided between the outer circumferential surface 11b of the small diameter annular portion 11 and an inner circumferential surface 6a of the one axial end portion 6 of the outer ring 3.

The inner circumferential surface 11a of the small diameter annular portion 11 is formed into a substantially cylindrical shape. Accordingly, there is a difference in inclination angle between the inner circumferential surface 11a and a radially inner side surface 13b formed into a taper shape in the same manner as the radially outer side surface 13a.

A second annular gap K2 as a gap needed for the inner circumferential surface 11a of the small diameter annular portion 11 and an outer circumferential surface 5a of the small collar portion 5 to be in sliding contact with each other is also provided between the inner circumferential surface 11a of the small diameter annular portion 11 and the outer circumferential surface 5a of the small collar portion 5.

In this manner, the small diameter annular portion 11 closes the small diameter side opening portion A1 while securing the annular gaps K1 and K2 with the small collar portion 5 and the one axial end portion 6 of the outer ring 3 respectively. The annular gaps K1 and K2 formed on one axial end side when the small diameter side opening portion A1 is closed serve as inlets through which lubricating oil can flow into the bearing internal space S in order to lubricate the tapered roller bearing 1.

When the inner and outer rings 2 and 3 rotate relatively to each other in the tapered roller bearing 1, lubricating oil located inside the bearing internal space S is agitated by revolutions of the tapered rollers 4 etc. and centrifugal force acts on the lubricating oil, so that pumping action can be generated to make the lubricating oil inside the bearing internal space S flow from a smaller diameter part to a larger diameter part on each raceway surface 2a, 3a.

The tapered roller bearing 1 according to the embodiment is typically used in a state where the tapered roller bearing 1 has been partially or entirely immersed in the lubricating oil.

Thus, due to the aforementioned pumping action, the lubricating oil flows into the bearing internal space S of the tapered roller bearing 1 through the small diameter side opening portion A1. In the tapered roller bearing 1 according to the embodiment, however, the small diameter annular portion 11 closes the small diameter side opening portion A1 while securing the annular gaps K1 and K2. Thus, the lubricating oil flowing into the bearing internal space S is limited to the lubricating oil passing through the annular gaps K1 and K2.

The first annular gap K1 and the second annular gap K2 permit the lubricating oil to pass therethrough, but limit the lubricating oil more than needed for lubrication inside the tapered roller bearing 1 from flowing into the bearing internal space S.

That is, the small diameter annular portion 11 closes the small diameter side opening portion A1 so as to limit the lubricating oil more than needed for lubrication from flowing into the bearing internal space S.

When the lubricating oil flowing into the bearing internal space S is more than needed for lubrication, there is a fear that the rotary torque of the tapered roller bearing 1 may be increased due to agitating resistance of the lubricating oil or rolling viscosity resistance.

With regard to this point, according to the embodiment, the inflow amount of the lubricating oil flowing into the bearing internal space S is limited (suppressed) by the small diameter annular portion 11 so that the rotary torque of the tapered roller bearing 1 can be reduced.

Here, the amount of the lubricating oil needed to lubricate the tapered roller bearing 1 is slight. When a slight gap is provided for allowing the lubricating oil to flow into the bearing internal space S, the needed amount of the lubricating oil can be secured.

Accordingly, the gap sizes of the first annular gap K1 and the second annular gap K2 are set at values that are as small as possible within a range permitting the lubricating oil to pass therethrough but giving no influence to operation of each portion.

As described above, the gap size of the first annular gap K1 is set to be as large as the clearance needed for the outer ring raceway surface 3a and the radially outer side surface 13a to be in sliding contact with each other at the working temperature with which the tapered roller bearing 1 should work.

For example, when the tapered roller bearing 1 measures 30 to 40 mm in inner diameter and 70 to 80 mm in outer diameter, the clearance needed for the outer ring raceway surface 3a and the radially outer side surface 13a to be in sliding contact with each other at the working temperature with which the tapered roller bearing 1 should work is set to be at least 100 μm by comparison between the diameters thereof. When the clearance is smaller than 100 μm, there is a fear that the contact surface pressure between the radially outer side surface 13a of the retainer 10 and the outer ring raceway surface 3a may be so large that the retainer 10 cannot slidingly contact smoothly on the outer ring raceway surface 3a.

When the clearance is set to be equal to or larger than at least 100 μm, the retainer 10 and the outer ring raceway surface 3a can be in sliding in contact with each other smoothly.

In addition, the first annular gap K1 is set to be as large as the aforementioned clearance, as described above. Therefore, the first annular gap K1 is set to be at least 100 μm, in the same manner as the clearance.

When the working temperature with which the tapered roller bearing 1 should work is 150° C., the clearance set thus at a normal temperature is displaced from its intended clearance under the working temperature due to a difference in thermal expansion coefficient between different materials of the outer ring 3 and the retainer 10.

Therefore, when the tapered roller bearing 1 has the aforementioned dimensions and when the material of the retainer 10 is polyphenylene sulfide (PPS), the clearance is set to be at least 200 μm at a normal temperature by comparison between the diameters thereof. Thus, when the outer ring 3 and the retainer 10 expand thermally at the working temperature of 150° C., the clearance can be set to be at least 100 μm by comparison between the diameters thereof.

The gap size of the second annular gap K2 at the working temperature is set to be larger than the clearance and the gap size of the first annular gap K1 at the working temperature, and to be two or less times as large as the clearance and the gap size of the first annular gap K1.

The outer circumferential surface 5a of the small collar portion 5 is lower in precision than the outer ring raceway surface 3a formed as a finished (for example, super-finished) surface with comparatively high precision. Accordingly, when the size of the second annular gap K2 at the working temperature is equal to or smaller than the clearance needed for the outer ring raceway surface 3a and the radially outer side surface 13a to be in sliding contact with each other at the bearing working temperature, there is a fear that the second annular gap K2 may be narrowed more than needed. Thus, there is a fear that a necessary inflow amount of lubricating oil cannot be secured. Further, there is a fear that the contact surface pressure between the outer ring raceway surface 3a and the radially outer side surface 13a may be larger than needed, so as to generate rotational resistance between the outer ring 3 and the retainer 10.

On the other hand, when the size of the second annular gap K2 at the working temperature is more than three times as large as the clearance at the bearing working temperature, there is a fear that lubricating oil more than needed for lubrication may be permitted to flow in.

When the size of the second annular gap K2 at the working temperature is set to be larger than the clearance at the bearing working temperature and to be three or less times as large as the clearance, the inflow amount of the lubricating oil can be limited properly.

For example, when the clearance under a normal temperature is set at 200 μm by comparison between the diameters and the clearance is 100 μm under the working temperature of 150° C., the gap size of the second annular gap K2 is set to be larger than 100 μm but equal to or smaller than 200 μm under the normal temperature, and to be larger than 200 μm but equal to or smaller than 300 μm under the working temperature.

Although the case where the size of the second annular gap K2 at the working temperature is set to be three or less times as large as the clearance has been described above, it is more preferable that the size of the second annular gap K2 at the working temperature is set to be two or less times as large as the clearance. Thus, the inflow amount of the lubricating oil can be limited more properly.

In this manner, the gap sizes of the first annular gap K1 and the second annular gap K2 are set at values as small as possible within a range permitting the lubricating oil to pass therethrough but giving no influence to operation of each portion.

The large diameter annular portion 12 of the retainer 10 is an annular part that is disposed between the large collar portion 7 provided on the other axial end side of the inner ring 2 and the other axial end portion 8 of the outer ring 3.

The radial thickness of the large diameter annular portion 12 is made smaller than the radial thickness of each columnar portion 13. Thus, as shown in FIG. 2 and FIG. 3, the large diameter annular portion 12 is provided so that the radially inner side surface 13b and the radially outer side surface 13a of each columnar portion 13 can form steps radially with the inner circumferential surface 12a and the outer circumferential surface 12b of the large diameter annular portion 12. That is, the columnar portion 13 has an inner circumferential end face 13c connecting the step between the radially inner side surface 13b of the columnar portion 13 and the inner circumferential surface 12a of the large diameter annular portion 12, and an outer circumferential end face 13d connecting the step between the radially outer side surface 13a of the columnar portion 13 and the outer circumferential surface 12b of the large diameter annular portion 12.

As shown in FIG. 1, the large diameter annular portion 12 is disposed in a large diameter side annular opening portion A2 constituted by the large collar portion 7 and the other axial end portion 8. A comparatively large gap is formed between the inner circumferential surface 12a of the large diameter annular portion 12 and an outer circumferential surface 7a of the large collar portion 7. In addition, a comparatively large gap is also formed between the outer circumferential surface 12b of the large diameter annular portion 12 and an inner circumferential surface 8a of the other axial end portion 8. These gaps formed between the large diameter annular portion 12 and the inner and outer rings 2 and 3 are formed to be larger than the aforementioned annular gaps K1 and K2.

Those gaps formed in the other end side annular opening portion A2 and formed between the large diameter annular portion 12 and the inner and outer rings 2 and 3 serve as discharge ports for the lubricating oil flowing into the bearing internal space S due to the aforementioned pumping action.

That is, the lubricating oil flowing into the bearing internal space S due to the aforementioned pumping action is used for lubrication in the bearing internal space S and discharged through the other end side annular opening portion A2.

In the embodiment, the gaps formed between the large diameter annular portion 12 and the inner and outer rings 2 and 3 are formed to be larger than the aforementioned annular gaps K1 and K2. Accordingly, the lubricating oil wanting to flow out to the outside of the tapered roller bearing 1 can be discharged to the outside quickly.

Figure 4:
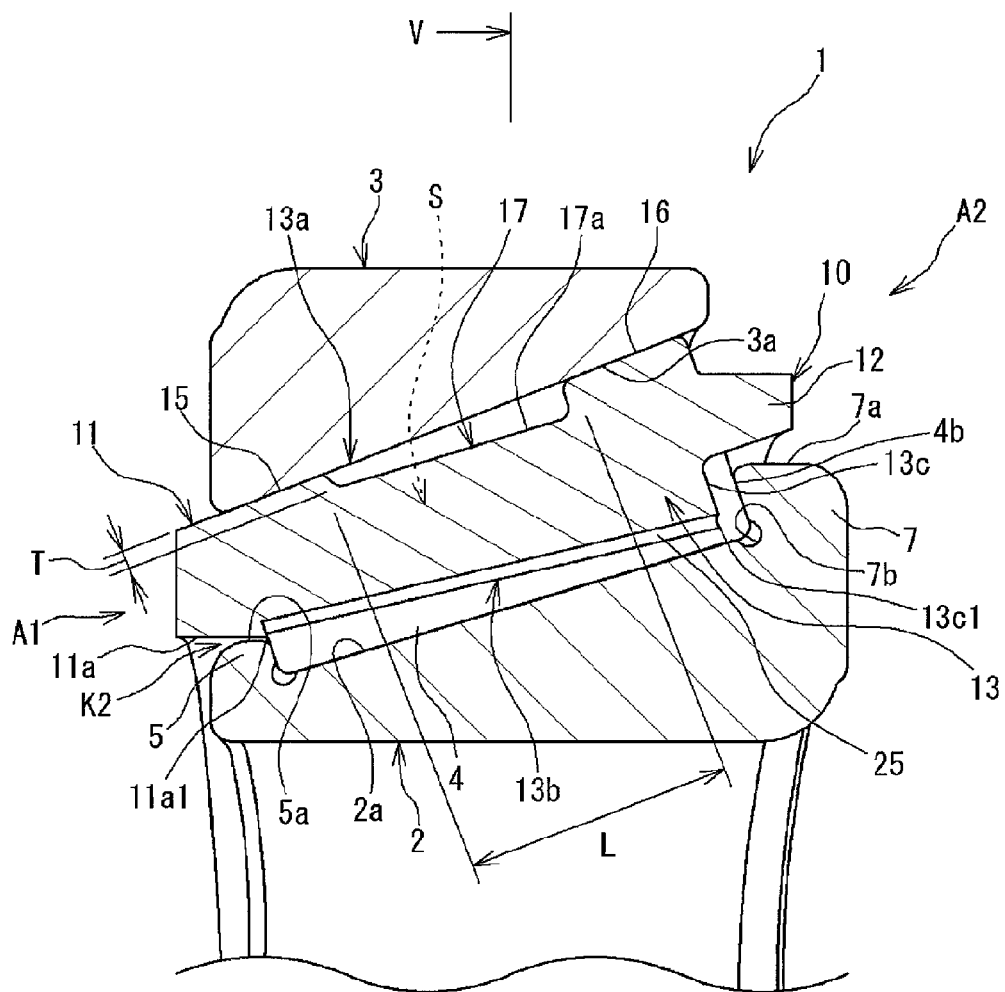
FIG. 4 is an axially sectional view of the tapered roller bearing, showing a section of a columnar portion.

FIG. 4 is an axially sectional view of the tapered roller bearing 1, showing a section of a columnar portion 13.

Also refer to FIG. 2 and FIG. 3. Each columnar portion 13 of the retainer 10 is positioned radially by the outer ring raceway surface 3*a* when the radially outer side surface 13*a* is rotated circumferentially relatively to the outer ring raceway surface 3*a* while being in sliding contact with the outer ring raceway surface 3*a*.

In the radially outer side surface 13*a* of the columnar portion 13, a small diameter side sliding contact face 15 and a large diameter side sliding contact face 16 are provided on the small diameter annular portion 11 side in the axial direction and on the large diameter annular portion 12 side in the axial direction respectively. The small diameter side sliding contact face 15 and the large diameter side sliding contact face 16 are formed into curved surfaces along the outer ring raceway surface 3*a* respectively, and provided to be in sliding contact with the outer ring raceway surface 3*a*. The small diameter side sliding contact face 15 and the large diameter side sliding contact face 16 are in sliding contact with the outer ring raceway surface 3*a* so that the retainer 10 can be positioned radially by the outer ring raceway surface 3*a*.

Incidentally, as described above, the inner circumferential surface 11*a* of the small diameter annular portion 11 in the retainer 10 is designed to be in sliding contact with the outer circumferential surface 5*a* of the small collar portion 5 of the inner ring 2. The inner circumferential surface 11*a* of the small diameter annular portion 11 is formed into a cylindrical shape parallel with the axial direction, so as to be in sliding contact with the cylindrical outer circumferential surface 5*a*.

On the other hand, the small diameter side sliding contact face 15 and the large diameter side sliding contact face 16 are formed into taper faces, which are in sliding contact with the outer ring raceway surface 3*a*.

In this manner, the retainer 10 is in sliding contact with the outer circumferential surface 5*a* on the inner ring 2 side and the outer ring raceway surface 3*a* on the outer ring 3 side. The outer circumferential surface 5*a* and the outer ring raceway surface 3*a* are formed with different inclination angles from each other. Due to this configuration, the retainer 10 can be positioned radially more surely.

In addition, since the small diameter side sliding contact face 15 is in sliding contact with the outer ring raceway surface 3*a*, the lubricating oil can be suppressed from flowing into the bearing internal space S from between the retainer 10 and the outer ring raceway surface 3*a*, so as to reduce the rolling viscosity resistance depending on the amount of the lubricating oil flowing in or the agitating resistance of the lubricating oil. Thus, the torque loss of the tapered roller bearing 1 can be reduced.

A recess portion 17 recessed radially relatively to the small diameter side sliding contact face 15 and the large diameter side sliding contact face 16 is formed between the small diameter side sliding contact face 15 and the large diameter side sliding contact face 16. Such a recess portion 17 is formed in each columnar portion 13. The recess portion 17 is provided to be located substantially at the center of the outer ring raceway surface 3*a* in the axial direction. The small diameter side sliding contact face 15 and the large diameter side sliding contact face 16 are provided on the axially opposite sides of the recess portion 17.

In this manner, the small diameter side sliding contact face 15 and the large diameter side sliding contact face 16 can be in sliding contact with the small diameter side end portion and the large diameter side end portion of the outer ring raceway surface 3*a* in the axial direction respectively. As a result, even when the recess portion 17 is provided in the radially outer side surface 13*a* of each columnar portion 13, there is no fear that the retainer 10 may be inclined with respect to the axial direction, but the small diameter side sliding contact face 15 and the large diameter side sliding contact face 16 can be made to slidingly contact stably on the outer ring raceway surface 3*a*.

In addition, the recess portion 17 is recessed all over the circumferential area of the columnar portion 13, so that adjacent ones of the pockets 14 can communicate with each other.

Here, in the tapered roller bearing 1 according to the embodiment, the inflow amount of the lubricating oil flowing into the bearing internal space S can be suppressed by the small diameter annular portion 11 of the retainer 10, so that the torque loss can be reduced.

In addition, the columnar portions 13 are in sliding contact with the outer ring raceway surface 3*a* so that the retainer 10 of the tapered roller bearing 1 can be positioned radially and guided to rotate by the outer ring raceway surface 3*a*. Thus, the retainer 10 can rotate stably and accurately between the inner and outer rings 2 and 3, and the small diameter annular portion 11 closing the small diameter side opening portion A1 can also rotate stably and accurately. As a result, the small diameter side opening portion A1 can be closed stably, and the inflow amount of the lubricating oil can be limited properly.

However, when the columnar portions 13 of the retainer 10 are in sliding contact with the outer ring raceway surface 3*a* in the tapered roller bearing 1, the effect of agitating the lubricating oil near the outer ring raceway surface 3*a* is enhanced so that the effect of pumping action can be enhanced by the increasing flow rate of the lubricating oil. Thus, the effect of attracting external lubricating oil into the bearing internal space S may be enhanced.

With regard to this point, in the tapered roller bearing 1 according to the embodiment, the recess portion 17 is provided in the radially outer side surface 13*a* of the retainer 10 and is recessed radially so that adjacent ones of the pockets 14 can communicate with each other. Thus, the lubricating oil near the outer ring raceway surface 3*a* can be made to flow between adjacent ones of the pockets 14, so as to weaken the agitating effect to thereby suppress the flow rate of the lubricating oil from increasing excessively. Thus, the effect of pumping action can be weakened to suppress the lubricating oil from excessively flowing into the bearing internal space S. As a result, the inflow amount of the lubricating oil into the bearing internal space S can be limited properly.

In this manner, in the tapered roller bearing 1 according to the embodiment, the inflow amount of the lubricating oil flowing into the bearing internal space S can be suppressed properly to reduce the torque loss.

A bottom face 17*a* of each recess portion 17 is formed into an arc centering on the axial center of the tapered roller bearing 1 in view from the axial direction. In addition, a gap T (FIG. 4) between the bottom face 17*a* of the recess portion 17 and the outer ring raceway surface 3*a* is set to be at least ten times as large as the gap (aforementioned clearance) needed for the two sliding contact faces 15 and 16 to be in sliding contact with the outer ring raceway surface 3*a* at the working temperature with which the tapered roller bearing 1 should work.

For example, when the clearance under the working temperature of 150° C. is set at 100 μm as described above, the gap T is set to be at least 1 mm.

When the gap T is less than ten times as large as the clearance under the working temperature of the tapered roller bearing 1, it is difficult to permit the lubricating oil near the outer ring raceway surface 3a to flow satisfactorily between adjacent ones of the pockets 14. Thus, the effect of weakening the pumping action deteriorates. Therefore, the gap T is set to be at least ten times as large as the clearance at the working temperature, so that the pumping action can be weakened effectively.

Incidentally, as the gap T is increased, the amount of the lubricating oil passing through the recess portion 17 can be increased so that the effect of pumping action can be made weaker. However, when the gap T is made too large, the radial thickness of the columnar portion 13 is reduced. Thus, there is a fear that the strength of the columnar portion 13 may be lowered. Therefore, the gap T is set within a range in which strength needed as the columnar portion 13 can be secured.

Since the circumferential velocity of the columnar portion 13 is higher at a part on the larger diameter side, the effect of agitating the lubricating oil is enhanced, and the part on the larger diameter side has larger contribution to the pumping action. On the other hand, when the amount of the lubricating oil passing through the recess portion 17 increases as described above, the effect of the pumping action can be weakened.

Accordingly, the bottom face 17a of the recess portion 17 in the embodiment is formed to be inclined linearly with respect to the outer ring raceway surface 3a so that the gap T can gradually expand axially from the small diameter annular portion 11 toward the large diameter annular portion 12.

In this manner, the gap T expands on the large diameter side where the agitating effect is higher than on the small diameter side. It is therefore possible to increase the amount of the lubricating oil passing through the gap T in a part closer to the large diameter annular portion 12, which is a part higher in agitating effect and larger in contribution to the pumping action. Thus, the pumping action can be weakened effectively with good balance from the small diameter side to the large diameter side.

In addition, the radial depth of the recess portion 17 can be reduced in a part on the small diameter side having relatively small contribution to the pumping action in the columnar portion 13. Therefore, the radial thickness of the columnar portion 13 does not have to be reduced largely. That is, in this case, the recess portion 17 is formed so that the radial depth of the recess portion 17 can increase only in a necessary part, advantageously in securing the strength needed as the columnar portion 13.

Axial length L (FIG. 4) of the recess portion 17 is set within a range equal to or larger than 40% of axial length of the outer ring raceway surface 3a and equal to or smaller than 70% of the same. When the axial length L of the recess portion 17 is made smaller than 40% of the axial length of the outer ring raceway surface 3a, the effect of weakening the pumping action deteriorates extremely. When the axial length L of the recess portion 17 is made larger than 70% of the axial length of the outer ring raceway surface 3a, it is difficult to secure an area needed as each of the two sliding contact faces 15 and 16 in the radially outer side surface 13a. When the axial length L of the recess portion 17 is set within a range equal to or larger than 40% of the axial length of the outer ring raceway surface 3a and equal to or smaller than 70% of the same, it is possible to weaken the pumping action effectively while securing an area needed as each of the two sliding contact faces 15 and 16.

Figure 5:
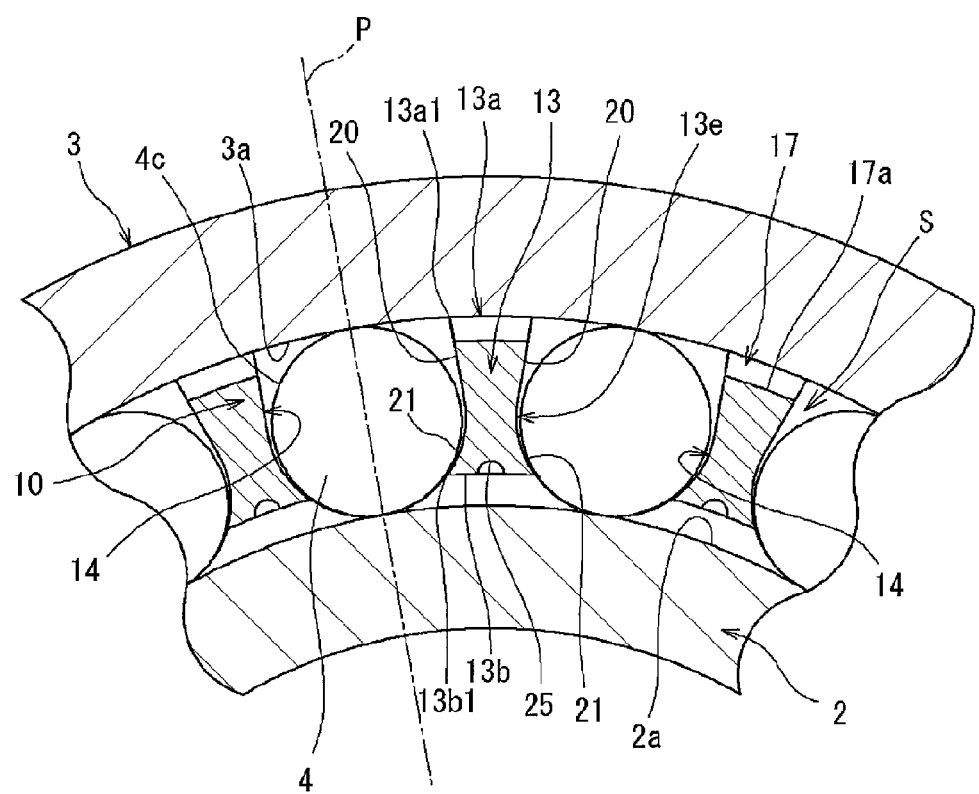
FIG. 5 is a sectional view taken in the arrow direction of the line V-V in FIG. 4.
Figure 6:
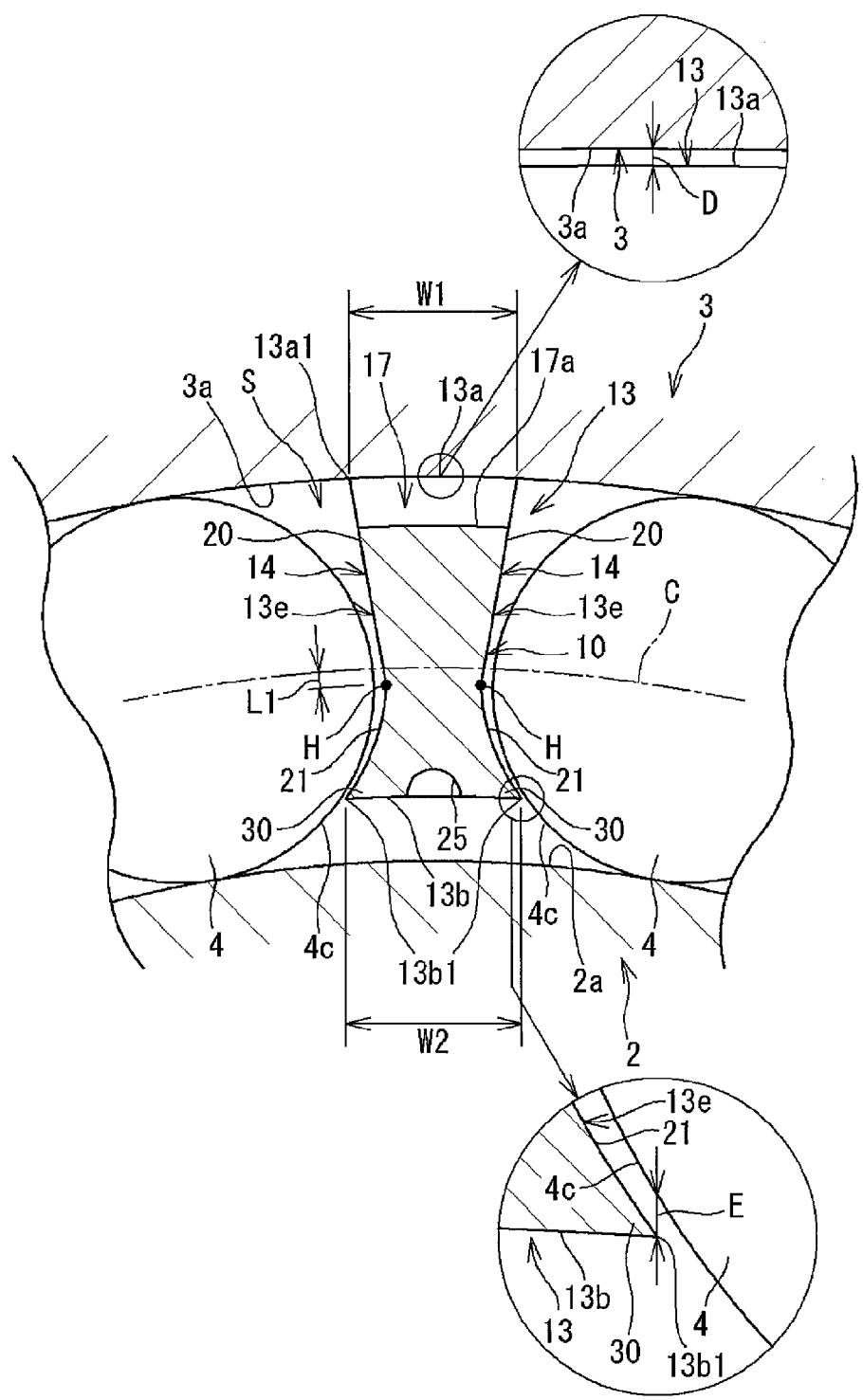
FIG. 6 is a partially enlarged view of FIG. 5.

FIG. 5 is a sectional view taken in the arrow direction of the line V-V in FIG. 4. FIG. 6 is a partially enlarged view of FIG. 5.

As shown in FIG. 4 to FIG. 6, the radially inner side surface 13b of each of the columnar portions 13 is disposed on the radially inner side of a pitch circle C centering on the axis of each of the tapered rollers 4, and an end portion of the radially inner side surface 13b on the large diameter annular portion 12 side is disposed on the radially inner side of the outer circumferential surface of the large collar portion 7.

A circumferential side surface 13e of each of the columnar portions 13 facing the inside of each of the pockets 14 is constituted by a flat face portion 20 and a curved face portion 21 as shown in FIG. 5. The flat face portion 20 extends like a flat face inward in the radial direction from a circumferential edge 13a1 of the radially outer side surface 13a. The curved face portion 21 connected from a radial end portion of the flat face portion 20 extends further inward in the radial direction.

Each flat face portion 20 extends to a position beyond the approximate center of the radial distance between the outer ring raceway surface 3a and the inner ring raceway surface 2a. To say other words, the radially inner end portion of the flat face portion 20 is located on the inner diameter side of the pitch circle of each tapered roller 4. The flat face portion 20 is formed into a flat face axially parallel to a straight line P by which the axial center of the tapered roller 4 received in the pocket 14 faced by the flat face portion 20 is connected to the axial center of the tapered roller bearing 1. Thus, the flat face portions 20 opposed to each other and forming a pocket 14 are formed axially in parallel with each other. The circumferential interval between the flat face portions 20 opposed to each other is made slightly larger than the outer diameter of the tapered roller 4, so that a slight gap can be provided between a rolling surface 4c of the tapered roller 4 and each flat face portion 20.

In this manner, the flat face portions 20 opposed to each other and forming a pocket 14 are formed axially in parallel with each other, so that the retainability of the tapered roller 4 can be enhanced.

The curved face portion 21 is formed into a curved face along the rolling surface of the tapered roller 4. The curved face portion 21 extends from a radial end portion of the flat face portion 20 to a circumferential edge (distal end) 13b1 of the radially inner side surface 13b of the columnar portion 13. The edge (distal end) 13b1 may be regarded as a radially inner edge of the curved face portion 21. A connection point H between the flat face portion 20 and the curved face portion 21 is disposed on the radially inner side of the pitch circle C centering on the axis of the tapered roller 4.

The curved face portion 21 is formed into a curved face along the inner ring raceway surface 2a side of the rolling surface 4c of the tapered roller 4. The circumferential width in the curved face portion 21 of the columnar portion 13 gradually expands inward in the radial direction. Circumferential width W2 of the radially inner side surface 13b is formed to be wider than circumferential width W1 of the radially outer side surface 13a of the columnar portion 13.

In addition, an angled portion (a distal end portion or a corner portion) 30 is formed by a circumferential end portion of the radially inner side surface 13b and the radially inner end portion of the curved face portion 21. The distal end of the angled portion 30 is formed as the circumferential edge (radially inner edge of the curved face portion 21) 13b1 of the radially inner side surface 13b. The angle between the circumferential end portion of the radially inner side surface 13b and the radially inner end portion of the curved face portion 21 is made acute or preferably made equal to or smaller than 60°. Thus, the angled portion 30 is made acute.

According to the aforementioned configuration, the curved face portion 21 can be made close to the inner ring raceway surface 2a side of the rolling surface 4c of the tapered roller 4. Thus, excessive lubricating oil more than needed for lubrication and adhering to the inner ring raceway surface 2a side of the rolling surface 4c can be scraped by the curved face portion 21. Particularly, of the curved face portion 21, the radially inner end portion is the closest to the inner ring raceway surface 2a side of the rolling surface 4c, while the angled portion 30 formed by the radially inner end portion of the curved face portion 21 and the circumferential end portion of the radially inner side surface 13b is made acute. Accordingly, excessive lubricating oil can be scraped well from the inner ring raceway surface 2a side of the rolling surface 4c by the angled portion 30. When scraping is performed thus, excessive lubricating oil between each of the inner and outer rings 2 and 3 and each of the tapered rollers 4 can be reduced to reduce the rolling viscosity resistance. Thus, the torque loss can be further reduced.

In addition, on the aforementioned occasion, the small diameter side sliding contact face 15 and the large diameter side sliding contact face 16 are in sliding contact with the outer race raceway surface 3a so that the retainer 10 can be positioned radially by the outer ring raceway surface 3a. Thus, the interval (gap or distance) between the curved face portion 21 and the rolling surface 4c of the tapered roller 4 can be kept proper, and excessive lubricating oil can be scraped well.

Incidentally, assume that the radial length D of the clearance (gap) between the outer ring raceway surface 3a and the radially outer side surface 13a of each columnar portion 13 is set at 100 μm as described above. In this case, the columnar portion 13, that is, the retainer 10 can move 100 μm outward in the radial direction. In order to prevent the circumferential side surface 13e of the columnar portion 13 from touching the rolling surface 4c of the tapered roller 4 due to the movement, a radial distance L1 from the connection point H between the flat face portion 20 and the curved face portion 21 to the pitch circle C is set at about 200 μm.

In addition, the interval (distance) between the curved face portion 21 and the rolling surface 4c of the tapered roller 4 is set to be 200 to 800 μm long with respect to the radial direction of the tapered roller 4. When the interval is set at 200 to 800 μm, a proper amount of lubricating oil can be kept between the curved face portion 21 and the rolling surface 4c of the tapered roller 4 easily due to surface tension. Thus, the tapered roller 4 can roll smoothly and easily to reduce the torque loss.

The reason why the aforementioned interval is made larger than 200 μm is to prevent the curved face portion 21 and the tapered roller 4 from touching each other even when the retainer 10 moves 100 μm outward in the radial direction as described above. To say other words, when the aforementioned interval is smaller than 200 μm, the curved face portion 21 and the tapered roller 4 touch each other so easily that the outer ring 3 cannot be guided well by the retainer 10.

On the other hand, when the aforementioned interval is larger than 800 μm, a proper amount of lubricating oil cannot be easily kept between the curved face portion 21 and the rolling surface 4c of the tapered roller 4. Further, when the interval is larger than 800 μm, excessive lubricating oil cannot be scraped well from the rolling surface 4c of the tapered roller 4.

Further, when the gap (interval) between the curved face portion 21 and the rolling surface 4c of the tapered roller 4 is set as described above, of the gap between the radially inner edge 13b1 of the curved face portion 21 and the rolling surface 4c, length with respect to the radial direction of the tapered roller bearing (that is, of the gap between the curved face portion 21 and the rolling surface 4c, minimum length with respect to the radial direction of the tapered roller bearing) E is made larger than the radial length D of the gap (clearance) between the outer ring raceway surface 3a and the radially outer side surface 13a of the columnar portion 13. Thus, the outer ring 3 can be guided well by the retainer 10, while the torque loss caused by the contact between the retainer 10 and the tapered roller 4 can be reduced.

The radially inner side surface 13b of the columnar portion 13 is formed so that its circumferential width can gradually increase from the small diameter annular portion 11 toward the large diameter annular portion 12, as shown in FIG. 3. In addition, the radially outer side surface 13a of the columnar portion 13 is also formed so that its circumferential width can gradually increase from the small diameter annular portion 11 toward the large diameter annular portion 12 in the same manner.

The radially inner side surface 13b is formed so that the amount of increase in circumferential width increasing toward the large diameter annular portion 12 is larger than in the radially outer side surface 13a.

Refer to FIG. 4. The radially inner side surface 13b of the columnar portion 13 extends like a straight line between an axially inner edge 11a1 of the inner circumferential surface 11a (inner circumferential surface end portion) of the small diameter annular portion 11 and an inner circumferential edge 13c1 of the inner circumferential end face 13c. The inner circumferential edge 13c1 of the columnar portion 13 extends to the vicinity of a base end portion 7b of the large collar portion 7. Thus, the radially inner side surface 13b extends from the axially inner edge 11a1 of the small diameter annular portion 11 toward the base end portion 7b of the large collar portion 7.

More specifically, the radially inner side surface 13b of the columnar portion 13 is inclined so that the diameter thereof can increase axially from the small diameter annular portion 11 toward the large diameter annular portion 12. Further, the radially inner side surface 13b is formed as a slope that is inclined to the inner ring raceway surface 2a so that the gap between the radially inner side surface 13b and the inner ring raceway surface 2a can be gradually narrowed axially from the small diameter annular portion 11 toward the large diameter annular portion 12.

Figure 7:
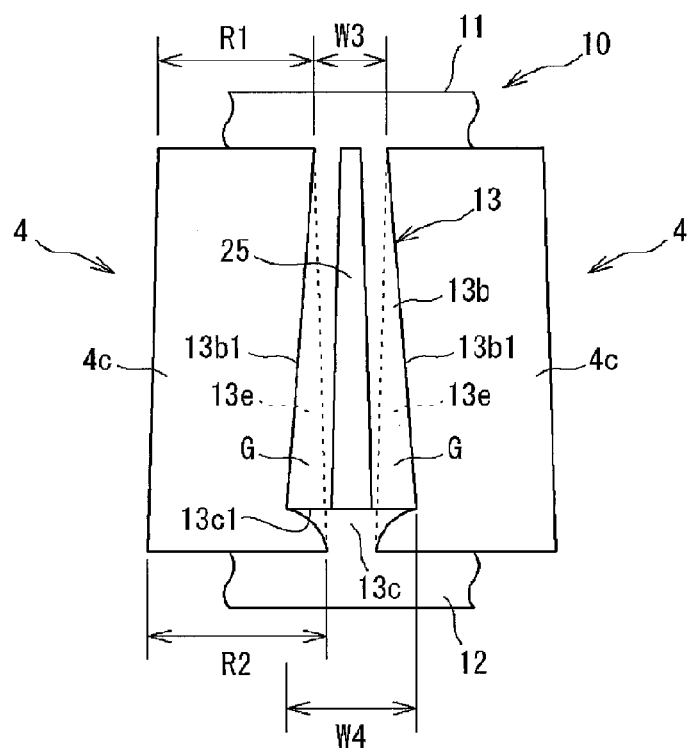
FIG. 7 is an explanatory view in which the columnar portion etc.

FIG. 7 is an explanatory view in which the columnar portion 13 etc. in FIG. 6 are observed from the radially inner side.

As shown in FIG. 7, the circumferential edge 13b1 of the radially inner side surface 13b of each columnar portion 13 is formed into a straight line inclined with respect to the axial direction. In the radially inner side surface 13b, circumferential width W4 in the end portion on the large diameter annular portion 12 side is made wider than circumferential width W3 in the end portion on the small diameter annular portion 11 side. In this manner, a part G where the circumferential side surface 13e of each columnar portion 13 overlaps with each tapered roller 4 when the columnar portion 13 is observed radially increases toward the large diameter annular portion 12. Further, a ratio W4/W3 of the circumferential width W4 to the circumferential width W3 is made larger than a ratio R2/R1 of a maximum outer diameter R2 to a minimum outer diameter R1 in each tapered roller. Thus, the overlapping part G can be made further larger toward the large diameter annular portion 12.

When the radially inner side surface 13b of each columnar portion 13 is formed thus, excessive lubricating oil adhering to the inner ring raceway surface 2a side of the rolling surface 4c of each tapered roller 4 can be scraped more satisfactorily in a position closer to the large diameter annular portion 12. Therefore, there is no fear that excessive lubricating oil between each of the inner and outer rings 2 and 3 and each tapered roller 4 stays on the large diameter annular portion 12 side, but the excessive lubricating oil can be discharged to the outside of the bearing 1 more quickly. As a result, the rolling viscosity resistance can be further reduced so that the torque loss can be further reduced.

As described above, the second annular gap K2 by which lubricating oil more than needed to lubricate the tapered roller bearing 1 can be limited from flowing into the bearing internal space S is provided between the inner circumferential surface 11a of the small diameter annular portion 11 and the outer circumferential surface 5a of the small collar portion 5.

Accordingly, while the amount of the lubricating oil flowing into the bearing internal space S is limited, a part of the lubricating oil flowing into the bearing internal space S through the second annular gap K2 due to pumping action is transmitted from the inner circumferential surface 11a of the small diameter annular portion 11 to the radially inner side surface 13b of each columnar portion 13.

The radially inner side surface 13b of the columnar portion 13 is inclined so that the diameter thereof can increase axially from the small diameter annular portion 11 toward the large diameter annular portion 12. Accordingly, when lubricating oil is transmitted to the radially inner side surface 13b, the lubricating oil further moves along the radially inner side surface 13b due to centrifugal force caused by the rotation of the retainer 10 and acting on the lubricating oil. Since the radially inner side surface 13b extends from the axially inner edge 11a1 of the small diameter annular portion 11 toward the base end portion 7b of the large collar portion 7, the lubricating oil moving along the radially inner side surface 13b is guided to the base end portion 7b of the large collar portion 7.

In this manner, the radially inner side surface 13b forms a guide surface by which lubricating oil flowing into the bearing internal space S through the second annular gap K2 can be guided to the base end portion 7b of the large collar portion 7.

Thus, the lubricating oil flowing in through the second annular gap K2 and transmitted to the radially inner side surface 13b can be guided to the base end portion 7b of the large collar portion 7. In this manner, while the amount of the lubricating oil flowing into the bearing internal space S is limited, the lubricating oil in the bearing internal space S can be aggressively supplied to the vicinity of a contact part where the large diameter side end face 4b of each tapered roller 4 and the large collar portion 7 slidingly contact smoothly on each other. As a result, it is possible to reduce the sliding friction resistance between the large diameter side end face 4b of the tapered roller 4 and the large collar portion 7 while limiting the amount of the lubricating oil flowing into the bearing internal space S in order to reduce the rotary torque. It is therefore possible to suppress occurrence of seizure caused by shortage of the lubricating oil.

That is, according to the embodiment, the amount of the lubricating oil flowing into the bearing internal space S is limited so as to suppress the rolling viscosity resistance depending on the amount of the lubricating oil flowing into the bearing internal space S or the agitating resistance of the lubricating oil to thereby reduce the torque loss. At the same time, the lubricating oil flowing into the bearing internal space S is guided and aggressively supplied to a sliding part needing lubricating oil, so as to reduce the sliding friction resistance. Thus, occurrence of seizure can be suppressed.

In addition, since the circumferential side surface 13e of each columnar portion 13 is formed by the flat face portion 20 and the curved face portion 21 as described above, the circumferential width W2 of the radially inner side surface 13b is formed to be wider than the circumferential width in the flat face portion 20 of the columnar portion 13. Accordingly, the area of the radially inner side surface 13b is, for example, larger than in the case where the circumferential side surface 13e is formed into a straight line extending in the radial direction.

Thus, it is possible to increase the amount of the lubricating oil that can be transmitted along the radially inner side surface 13b, that is, the amount of the lubricating oil that can be guided.

Further, in the radially inner side surface 13b, as shown in FIG. 4 to FIG. 7, a groove portion 25 recessed outward in the radial direction is formed substantially at the circumferential center. Such a groove portion 25 is formed in each columnar portion 13. The groove portion 25 is recessed like a semicircle. The groove portion 25 is formed axially all over the axial area of the radially inner side surface 13b. In addition, the width of the groove portion 25 is formed to gradually increase toward the large diameter annular portion 12.

When the groove portion 25 is formed in the radially inner side surface 13b, the lubricating oil flowing through the second annular gap K2 and transmitted to the radially inner side surface 13b can be kept in the groove portion 25. Further, the lubricating oil kept in the groove portion 25 can be guided to the base end portion 7b of the large collar portion 7 along the groove portion 25. Thus, the lubricating oil can be guided to the base end portion 7b of the large collar portion 7 more surely.

In addition, the lubricating oil scraped from the rolling surface 4c of the tapered roller 4 by the curved face portion 21 of the circumferential side surface 13e can be kept in the groove portion 25. The lubricating oil can be prevented from returning to the rolling surface 4c of the tapered roller 4 or the like. In addition, since the lubricating oil is scraped by the curved face portion 21 extending axially as described above, the amount of the lubricating oil stored in the groove portion 25 increases toward the large diameter annular portion 12. However, the width of the groove portion 25 gradually increases toward the large diameter annular portion 12. Accordingly, the lubricating oil can be prevented from overflowing from the groove portion 25 and returning to the rolling surface 4c etc.

In addition, according to the embodiment, the radially inner side surface 13b of each columnar portion 13 is inclined with respect to the inner ring raceway surface 2a so that a gap between the radially inner side surface 13b and the inner ring raceway surface 2a can be gradually narrowed axially from the small diameter annular portion 11 toward the large diameter annular portion 12. Accordingly, the lubricating oil can be guided to the base end portion 7b of the large collar portion 7 smoothly by the radially inner side surface 13b where there is no step or the like in the axial direction.

Figure 8:
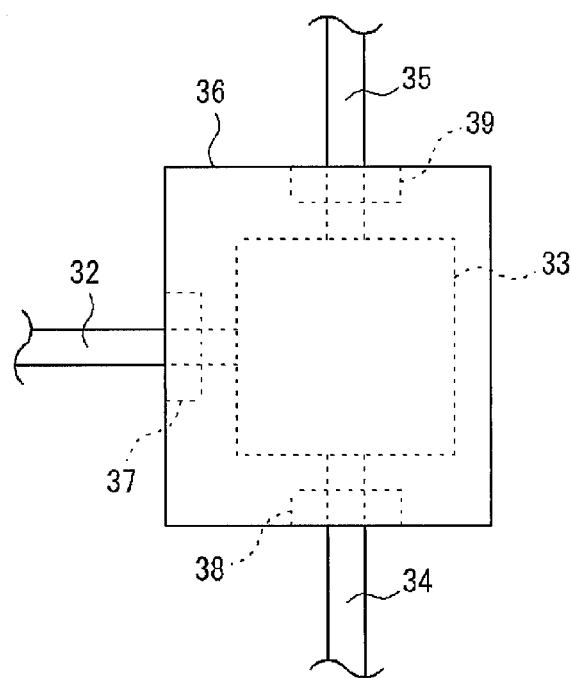
FIG. 8 is an explanatory view of a power transmission apparatus according to an embodiment of the invention.

FIG. 8 is an explanatory view of a power transmission apparatus 31 of a car.

In the power transmission apparatus 31, as shown in FIG. 8, left and right axles 34 and 35 are driven through a differential 33 by a drive shaft 32. The differential 33 is built in a housing 36 serving as a support. The drive shaft 32 and the axles 34 and 35 serving as transmission shafts are rotatably supported on the housing 36 through tapered roller bearings 37 to 39 according to the invention.

According to this configuration example, the drive shaft 32 and the axles 34 and 35 serving as transmission shafts are supported on the housing 36 through the tapered roller bearings 37 to 39 according to the invention capable of reducing the torque loss. Thus, the power loss during power transmission through the drive shaft 32 and the axles 34 and 35 can be reduced.

Incidentally, the invention is not limited to the aforementioned embodiment.

The aforementioned embodiment showed a case where the bottom face 17a of the recess portion 17 provided in the radially outer side surface 13a is formed to be inclined in a straight line with respect to the outer ring raceway surface 3a so that the gap T can gradually expand axially from the small diameter annular portion 11 toward the lager diameter annular portion 12. However, as long as lubricating oil can be passed through properly and pumping action can be suppressed, the bottom face 17a may be formed to be parallel with the radially outer side surface 13a, or the bottom face 17a may be formed into a circular shape or a curved surface.

Figure 9A:
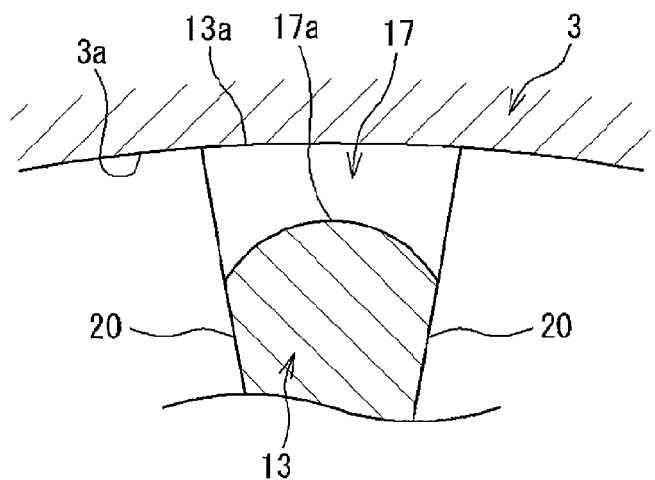
FIG. 9(a) and FIG. 9(b) are main portion sectional views of a columnar portion, showing a modification example of a recess portion.

In addition, the aforementioned embodiment showed a case where the shape of the bottom face 17a of the recess portion 17 observed axially is formed into an arc centering on the axial center of the tapered roller bearing 1. However, as shown in FIG. 9(a), the shape of the bottom face 17a observed axially may be formed into an arc with a smaller radius so that the gap with the outer ring raceway surface 3a can increase from the circumferential center of the bottom face 17a toward the flat face portion 20. In this case, the lubricating oil can be smoothly guided into and passed through the gap between the recess portion 17 and the outer ring raceway surface 3a.

Figure 9B:
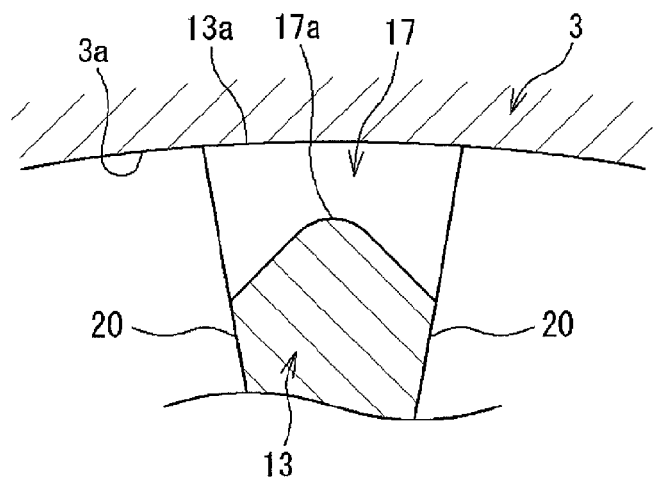

In addition, as shown in FIG. 9(b), the shape of the bottom face 17a observed axially may be formed into a triangular shape. Also in this case, the lubricating oil can be smoothly guided into and passed through the gap between the recess portion 17 and the outer ring raceway surface 3a in the same manner as in FIG. 9(a).

In addition, the aforementioned embodiment showed an example in which the recess portions 17 of the radially outer side surfaces 13a are provided in all the columnar portions 13, the recess portions 17 do not have to be provided in all the columnar portions 13, but a suitable change may be made. For example, the recess portions 17 may be provided in every other ones of the columnar portions 13 arranged circumferentially.

Figure 10A:
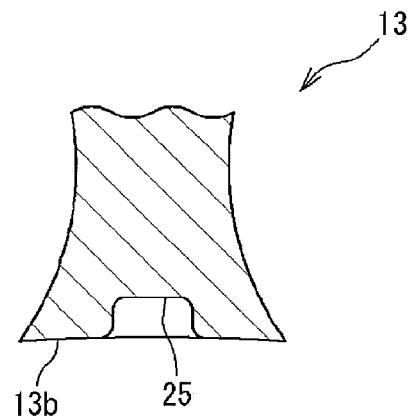
FIG. 10(a), FIG. 10(b) and FIG. 10(c) are main portion sectional views of a columnar portion, showing a modification example of a groove portion.
Figure 10B:
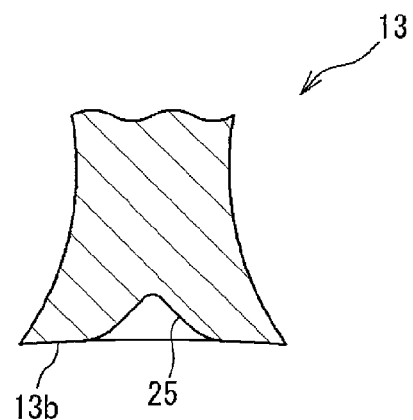
Figure 10C:
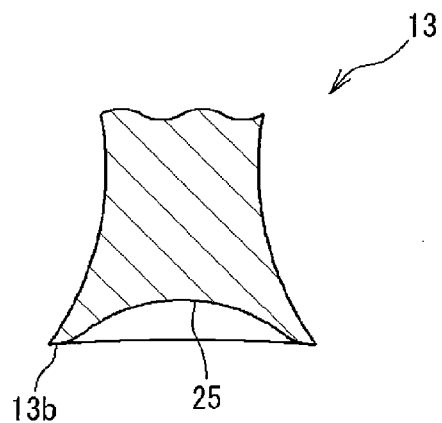

The aforementioned embodiment showed a case where the groove portion 25 provided in the radially inner side surface 13b is formed as a groove recessed like a semicircular shape. However, the groove portion 25 may be, for example, formed into a rectangular shape, a triangular shape or the like as shown in FIG. 10(a) or (b) as long as lubricating oil can be kept inside the groove portion 25. Alternatively, the groove portion 25 may be formed by a recess provided substantially all over the radial area of the radially inner side surface 13b as shown in FIG. 10(c). In this case, lubricating oil can be kept substantially all over the radial area of the radially inner side surface 13b so that more lubricating oil can be collected and guided to the base end portion 7b of the large collar portion 7.

Figure 11:
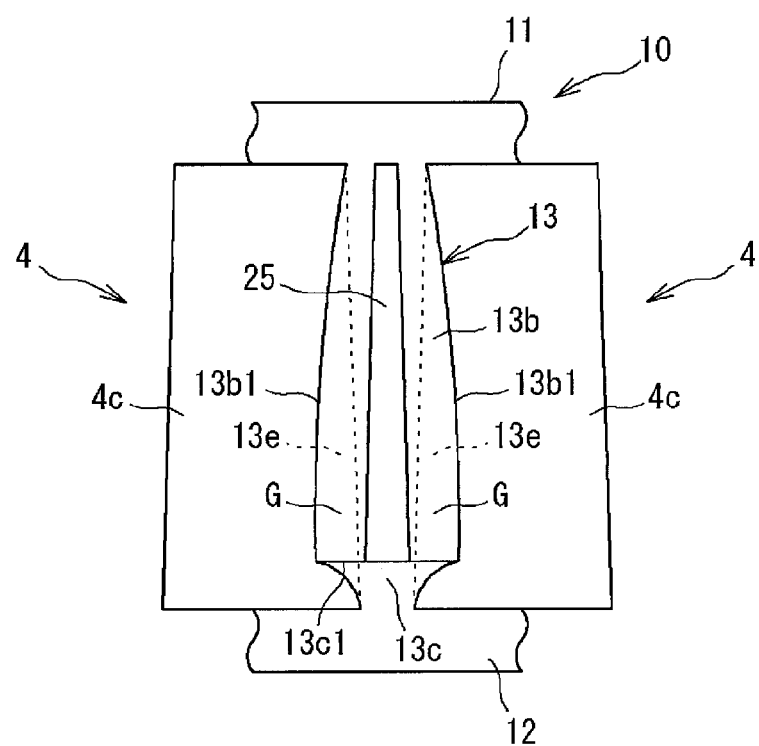
FIG. 11 is an explanatory view showing a modification example of a radially inner side surface.
Figure 12:
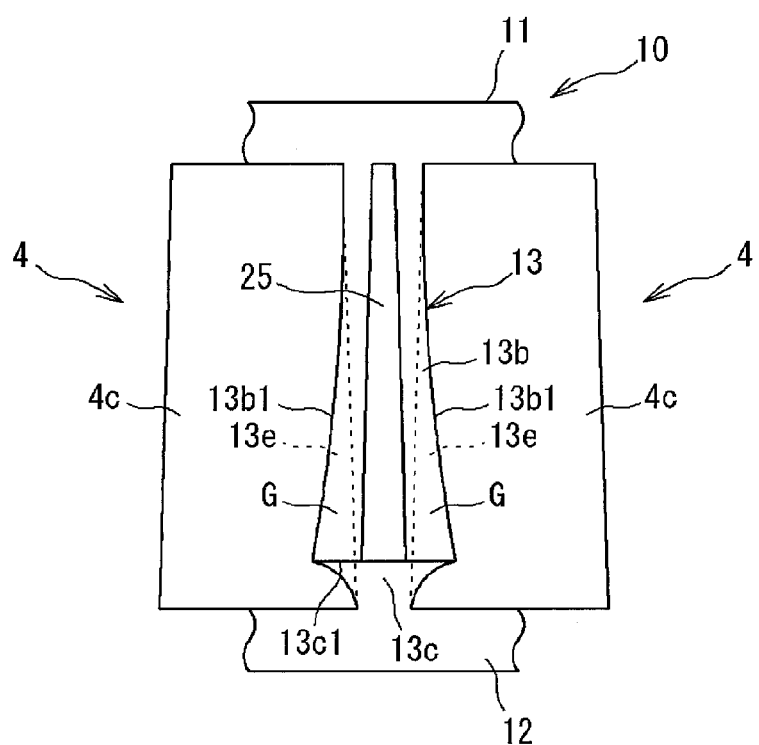
FIG. 12 is an explanatory view showing another modification example of a radially inner side surface.
Figure 13:
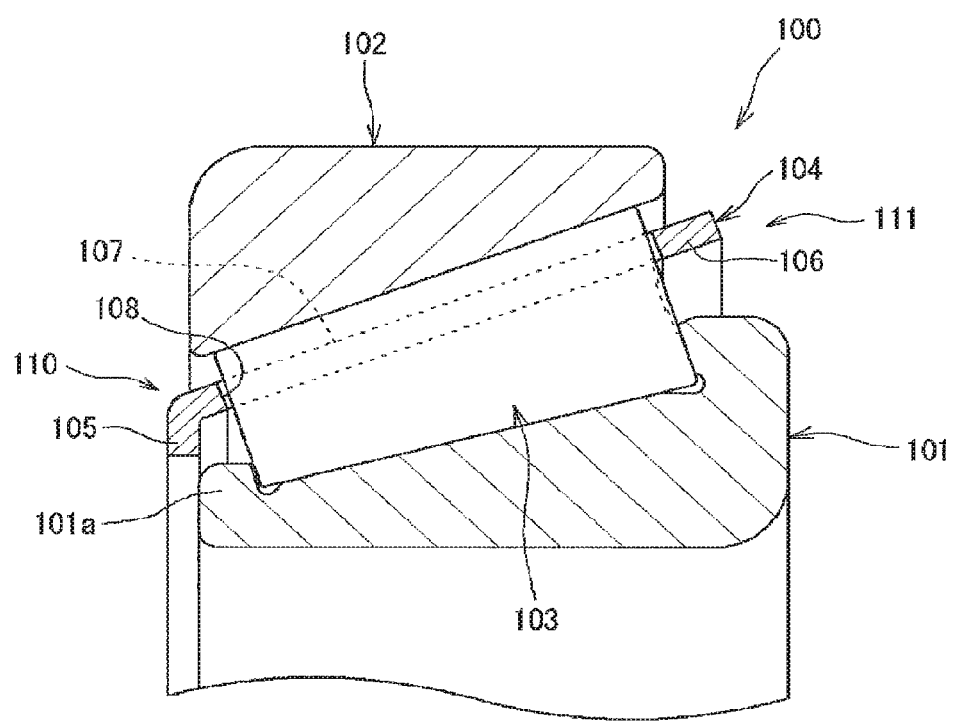
FIG. 13 is an axially sectional view showing a tapered roller bearing in the related art.

Further, in the aforementioned embodiment, the circumferential edge 13b1 of the radially inner side surface 13b in each columnar portion is formed into a straight line when the columnar portion is observed radially. However, the circumferential edge 13b1 may be formed circumferentially like a curved convex as shown in FIG. 11 or like a curved concave as shown in FIG. 12.

The present application is based on a Japanese patent application (Japanese Patent Application No. 2013-242043) filed on Nov. 22, 2013, a Japanese patent application (Japanese Patent Application No. 2013-242058) filed on Nov. 22, 2013, and a Japanese patent application (Japanese Patent Application No. 2013-261376) filed on Dec. 18, 2013, the contents of which are incorporated herein by reference.

INDUSTRIAL APPLICABILITY

According to one configuration of the invention, it is possible to provide a tapered roller bearing capable of properly suppressing the inflow amount of lubricating oil flowing into an internal space of the bearing to thereby reduce a torque loss, and a power transmission apparatus using the tapered roller bearing. In addition, according to another configuration of the invention, it is possible to provide a tapered roller bearing capable of reducing sliding friction resistance to suppress occurrence of seizure while limiting the amount of lubricating oil flowing into an internal space of the bearing in order to reduce rotary torque, and a power transmission apparatus using the tapered roller bearing.

DESCRIPTION OF REFERENCE NUMERALS AND SIGNS 1 tapered roller bearing
2 inner ring
2a inner ring raceway surface
3 outer ring
3a outer ring raceway surface
4 tapered roller
4c rolling surface
5 small collar portion
5a outer circumferential surface
6 one axial end portion
7 large collar portion
7b base end portion
10 retainer
11 small diameter annular portion
11a inner circumferential surface
11a1 axially inner edge (inner circumferential end portion)
12 large diameter annular portion
13 columnar portion
13a radially outer side surface
13b radially inner side surface
13e circumferential side surface
14 pocket
15 small diameter side sliding contact face
16 large diameter side sliding contact face
17 recess portion
17a bottom face
25 groove portion
32 drive shaft (transmission shaft)
33, 34 axle (transmission shaft)
36 housing (support)

A1 small diameter side opening portion
K2 second annular gap
C pitch circle
G overlapping part
W1 to W4 circumferential width

The invention claimed is:
1. A tapered roller bearing comprising:
an inner ring that has an inner ring raceway surface;
an outer ring that is disposed on an outer circumferential side of the inner ring and concentrically with the inner ring, and that has an outer ring raceway surface opposed to the inner ring raceway surface;
a plurality of tapered rollers that are rollably placed between the inner ring raceway surface and the outer ring raceway surface; and
a retainer that is disposed in an annular space between the inner ring and the outer ring, and that retains the tapered rollers, wherein:
the retainer includes a small diameter annular portion, a large diameter annular portion opposed to the small diameter annular portion with a predetermined distance, and a plurality of columnar portions laid between the small diameter annular portion and the large diameter annular portion, wherein spaces surrounded by adjacent ones of the columnar portions, the small diameter annular portion and the large diameter annular portion are formed as pockets receiving the tapered rollers;
the small diameter annular portion is disposed between a small collar portion provided on one axial end side of the inner ring and one axial end portion of the outer ring, and an inner circumferential surface and an outer circumferential surface of the small diameter annular portion can be in sliding contact with the small collar portion and the one axial end portion of the outer ring so that an annular opening portion constituted by the small collar portion and the one axial end portion of the outer ring is closed;
a sliding contact face is provided in a radially outer side surface of each of the columnar portions, and is in sliding contact with the outer ring raceway surface so that the retainer is positioned radially by the outer ring raceway surface, and a recess portion is provided in the radially outer side surface of each of the columnar portions, and is recessed radially so that adjacent ones of the pockets communicate with each other; and
a bottom face of the recess portion is a slope that is inclined with respect to the outer ring raceway surface so that a gap between the bottom face and the outer ring raceway surface gradually expands axially from the small diameter annular portion toward the large diameter annular portion.
2. The tapered roller bearing according to claim 1, wherein the recess portion is provided to be located at an axial center of the outer ring raceway surface.
3. The tapered roller bearing according to claim 1, wherein axial length of the recess portion is set within a range equal to or larger than 40% of axial length of the outer ring raceway surface and equal to or smaller than 70% of the axial length of the outer ring raceway surface.
4. The tapered roller bearing according to claim 1, wherein a gap between a bottom face of the recess portion and the outer ring raceway surface is set to be at least ten times as large as a gap needed for the outer ring raceway surface and the sliding contact face to be in sliding contact with each other at a bearing working temperature.

5. The tapered roller bearing according to claim 1, wherein:
an annular gap for limiting lubricating oil more than needed for lubrication from flowing into the annular space is formed between an inner circumferential surface of the small diameter annular portion and an outer circumferential surface of the small collar portion; and
a radially inner side surface of each of the columnar portions is formed into a guide surface that extends from an end portion of the inner circumferential surface of the small diameter annular portion toward a base end portion of a large collar portion provided on the other axial end side of the inner ring so that the lubricating oil flowing into the annular space through the annular gap is guided to the base end portion of the large collar portion.
6. The tapered roller bearing according to claim 5, wherein the radially inner side surface is a slope that is inclined with respect to the inner ring raceway surface so that a gap between the radially inner side surface and the inner ring raceway surface is gradually narrowed axially from the small diameter annular portion toward the large diameter annular portion.
7. The tapered roller bearing according to claim 5, wherein a groove portion that is recessed radially outward is formed axially in the radially inner side surface.
8. The tapered roller bearing according to claim 1 wherein a size of the annular gap at a bearing working temperature is set to be larger than a size of a gap needed for the outer ring raceway surface and the sliding contact face to be in sliding contact with each other at the bearing working temperature, and to be three or less times as large as the size of the gap.
9. The tapered roller bearing according to claim 1, wherein:
an end portion of a radially inner side surface of each of the columnar portions on a side of the large diameter annular portion is disposed on a radially inner side of an outer circumferential surface of a large collar portion of one axial end portion of the inner ring; and
an inner circumferential side of a circumferential side surface of each of the columnar portions is formed into a curved surface along a rolling surface of each of the tapered rollers, and a circumferential width W2 of the radially inner side surface of each of the columnar portions is made wider than a circumferential width W1 of the radially outer side surface of each of the columnar portions.
10. The tapered roller bearing according to claim 9, wherein a gap in a radial direction between the inner circumferential side of each of the columnar portions and the rolling surface is made larger than a gap in the same radial direction between the radially outer side surface of each of the columnar portions and the outer ring raceway surface.
11. The tapered roller bearing according to claim 9, wherein, in the radially inner side surface of each of the columnar portions, a circumferential width W4 of the end portion on the side of the large diameter annular portion is made wider than a circumferential width W3 of an end portion on a side of the small diameter annular portion.
12. The tapered roller bearing according to claim 11, wherein a ratio W4/W3 of the circumferential width W4 to the circumferential width W3 is made larger than a ratio R2/R1 of a maximum outer diameter R2 to a minimum outer diameter R1 in each of the tapered rollers.
13. The tapered roller bearing according to claim 9, wherein a guide groove for guiding lubricating oil to the large collar portion is formed axially in the radially inner side surface of each of the columnar portions.

14. The tapered roller bearing according to claim 13, wherein a width of the guide groove gradually increases toward the large diameter annular portion.

15. A power transmission apparatus comprising: a transmission shaft; the tapered roller bearing according to claim 1, and a support that supports the transmission shaft rotatably through the tapered roller bearing.

16. A tapered roller bearing comprising:
an inner ring that has an inner ring raceway surface;
an outer ring that is disposed on an outer circumferential side of the inner ring and concentrically with the inner ring, and that has an outer ring raceway surface opposed to the inner ring raceway surface;
a plurality of tapered rollers that are rollably placed between the inner ring raceway surface and the outer ring raceway surface; and
a retainer that is disposed in an annular space between the inner ring and the outer ring, and that retains the tapered rollers, wherein:
the retainer includes a small diameter annular portion, a large diameter annular portion opposed to the small diameter annular portion with a predetermined distance, and a plurality of columnar portions laid between the small diameter annular portion and the large diameter annular portion, wherein spaces surrounded by adjacent ones of the columnar portions, the small diameter annular portion and the large diameter annular portion are formed as pockets receiving the tapered rollers;
the small diameter annular portion is disposed between a small collar portion provided on one axial end side of the inner ring and one axial end portion of the outer ring, and an inner circumferential surface and an outer circumferential surface of the small diameter annular portion can be in sliding contact with the small collar portion and the one axial end portion of the outer ring so that an annular opening portion constituted by the small collar portion and the one axial end portion of the outer ring is closed while an annular gap for limiting lubricating oil more than needed for lubricating the tapered roller bearing from flowing into the annular space is formed between an inner circumferential surface of the small diameter annular portion and an outer circumferential surface of the small collar portion; and
a radially inner side surface of each of the columnar portions defines a groove that extends from and is delimited by an end portion of the inner circumferential surface of the small diameter annular portion toward a base end portion of a large collar portion provided on the other axial end side of the inner ring so that the lubricating oil flowing into the annular space through the annular gap is guided to the base end portion of the large collar portion.

17. The tapered roller bearing according to claim 16, wherein the radially inner side surface is a slope that is inclined with respect to the inner ring raceway surface so that a gap between the radially inner side surface and the inner ring raceway surface is gradually narrowed axially from the small diameter annular portion toward the large diameter annular portion.

18. The tapered roller bearing according to claim 16, wherein a size of the annular gap at a bearing working temperature is set to be larger than a size of a gap needed for the outer ring raceway surface and a sliding contact face to be in sliding contact with each other at the bearing working temperature, and to be three or less times as large as the size of the gap.

19. The tapered roller bearing according to claim 16, wherein a sliding contact face is provided in a radially outer side surface of each of the columnar portions, and is in sliding contact with the outer ring raceway surface so that the retainer is positioned radially by the outer ring raceway surface.

20. The tapered roller bearing according to claim 19, wherein a recess portion is provided in the axially outer side surface of each of the columnar portions, and is recessed radially so that adjacent ones of the pockets communicate with each other.

21. The tapered roller bearing according to claim 16, wherein:
a sliding contact face is provided in a radially outer side surface of each of the columnar portions, and is in sliding contact with the outer ring raceway surface so that the retainer is positioned radially by the outer ring raceway surface;
an end portion of a radially inner side surface of each of the columnar portions on a side of the large diameter annular portion is disposed on a radially inner side of an outer circumferential surface of a large collar portion at one axial end portion of the inner ring; and
an inner circumferential side of a circumferential side surface of each of the columnar portions is formed into a curved surface along a rolling surface of each of the tapered rollers, and a circumferential width W2 of the radially inner side surface of each of the columnar portions is made wider than a circumferential width W1 of the radially outer side surface of each of the columnar portions.

22. The tapered roller bearing according to claim 21, wherein a gap in a radial direction between the inner circumferential side of each of the columnar portions and the rolling surface is made larger than a gap in the same radial direction between the radially outer side surface of each of the columnar portions and the outer ring raceway surface.

23. The tapered roller bearing according to claim 21, wherein, in the radially inner side surface of each of the columnar portions, a circumferential width W4 of the end portion on the side of the large diameter annular portion is made wider than a circumferential width W3 of an end portion on a side of the small diameter annular portion.

24. The tapered roller bearing according to claim 23, wherein a ratio W4/W3 of the circumferential width W4 to the circumferential width W3 is made larger than a ratio R2/R1 of a maximum outer diameter R2 to a minimum outer diameter R1 in each of the tapered rollers.

25. The tapered roller bearing according to claim 21, wherein a guide groove for guiding lubricating oil to the large collar portion is formed axially in the radially inner side surface of each of the columnar portions.

26. The tapered roller bearing according to claim 25, wherein a width of the guide groove gradually increases toward the large diameter annular portion.

27. A power transmission apparatus comprising: a transmission shaft; the tapered roller bearing according to claim 16; and a support that supports the transmission shaft rotatably through the tapered roller bearing.

* * * * *